(12) United States Patent
Matsushima et al.

(10) Patent No.: US 7,926,352 B2
(45) Date of Patent: Apr. 19, 2011

(54) SEMICONDUCTOR PRESSURE SENSOR AND DATA PROCESSING DEVICE

(75) Inventors: Tadashi Matsushima, Tokyo (JP); Masaru Sugai, Tokyo (JP); Chung Wen Hung, Taipei (TW); Yuji Shimizu, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 183 days.

(21) Appl. No.: 12/343,236

(22) Filed: Dec. 23, 2008

(65) Prior Publication Data

US 2009/0165564 A1    Jul. 2, 2009

(30) Foreign Application Priority Data

Dec. 26, 2007    (JP) ................. 2007-333578

(51) Int. Cl.
*G01L 9/00* (2006.01)
(52) U.S. Cl. .......................... 73/754; 73/725
(58) Field of Classification Search .................. None
See application file for complete search history.

(56) References Cited

U.S. PATENT DOCUMENTS

| | | | | |
|---|---|---|---|---|
| 5,099,695 A | * | 3/1992 | Sugano et al. | 73/708 |
| 5,279,164 A | * | 1/1994 | Araki et al. | 73/708 |
| 5,460,050 A | * | 10/1995 | Miyano | 73/766 |
| 5,854,421 A | * | 12/1998 | Yamamoto | 73/1.88 |
| 6,101,883 A | * | 8/2000 | Takeuchi | 73/754 |

FOREIGN PATENT DOCUMENTS

JP    5-248975 A    9/1993

OTHER PUBLICATIONS

Fujikura Ltd., "FPN, FGN-6 Data Sheet" [on line], [searched on Nov. 19, 2007] Internet URL:www.fujikura.co.jp/00/sensor/jpn/j_pdf/j_fpngn.pdf, (Japanese and English versions).

* cited by examiner

*Primary Examiner* — Andre J Allen
(74) *Attorney, Agent, or Firm* — Miles & Stockbridge P.C.

(57) ABSTRACT

For example, to adjust an offset of a pressure sensor, there are provided an external resistor RE and an internal resistor circuit that is connected to both ends of RE and formed in a semiconductor chip such as a processor. The internal resistor circuit includes N pieces of internal resistors RI connected in series between both ends of RE, and (N+1) pieces of switches selecting one of voltages of respective nodes of the serial resistors and outputs the same as a signal. RE has a high absolute value precision of, e.g., several ten ohms to several hundred ohms, and RI has a high relative value precision of, e.g., several kilo-ohms. Therefore, an offset adjustment range is decided at a high absolute value precision mainly by RE, and with regard to the arrangement resolution, a high precision can be obtained along with the relative value precision of the RI.

10 Claims, 15 Drawing Sheets

SEMICONDUCTOR PRESSURE SENSOR AND DATA PROCESSING DEVICE

CROSS-REFERENCE TO RELATED APPLICATION

The present application claims priority from Japanese Patent Application No. JP 2007-333578 filed on Dec. 26, 2007, the content of which is hereby incorporated by reference into this application.

TECHNICAL FIELD OF THE INVENTION

The present invention relates to a semiconductor pressure sensor and a data processing device, in particular, it relates to a technology effectively applied to a semiconductor pressure sensor including an offset adjustment function.

BACKGROUND OF THE INVENTION

For example, Japanese Patent Application Laid-Open Publication No. H05-248975 (Patent Document 1) discloses a pressure sensor comprising a bridge circuit, and a semiconductor pressure sensor circuit where an offset adjustment circuit is inserted in a circuit loop of the bridge circuit are shown. This offset adjustment circuit has a configuration where resistors in parallel connection can be connected between two nodes in which a part of the circuit loop is opened, and it is selected which resistor to be connected by opening and closing a switch element, so that a variable resistor looks like being connected equivalently between nodes. Meanwhile, the opening and closing information of the switch element is memorized in an EEPROM (Electronically Erasable and Programmable Read Only Memory).

In addition, in Fujikura Ltd., "FPN, FGN-6 Data Sheet", [on line], [searched on Nov. 19, 2007], Internet <URL: www.fujikura.co.jp/00/sensor/jpn/j_pdf/j_fpngn.pdf> (Non-Patent Document 1), the specifications of a sensor element for gauge pressure consisting of a bridge circuit are shown. It is described that, in this sensor element, a part of the circuit loop of the bridge circuit is opened, and when to performing an offset adjustment of the bridge circuit, a zero balance trimmer resistor (VR0) of, for example, 200Ω is inserted into this opened part.

SUMMERY OF THE INVENTION

Meanwhile, as a result of examinations by the inventors of the present invention about the technologies of the semiconductor pressure sensor device and the data processing device such as those mentioned above, the followings have become clear.

FIG. 14 is a circuit diagram showing an example of a configuration in a semiconductor pressure sensor device that has been examined as a premise of the present invention. This semiconductor pressure sensor device reflects the configuration example of the Non-Patent Document 1 mentioned above. In the semiconductor pressure sensor device of FIG. 14, four pressure sensor elements (piezoresistors) RP1 to RP4 configure a bridge circuit (Wheatstone bridge circuit), and with the connection nodes of RP3 and RP4 as the standard, a constant current from a constant current source IS is supplied to the connection nodes of RP1 and RP2.

Between RP1 and RP4, a variable resistor (zero balance trimmer resistor) VR0 of, for example, 200Ω or the like is connected, and the potential difference between the node on this VR0 and the connection node of RP2 and RP3 becomes the output of the bridge circuit, and it is amplified in an amplification circuit AMP. The output of this AMP is converted into a digital value by an analog-digital conversion unit ADC, and this is processed so that an unbalance degree of the resistance values of RP1 to RP4 and the pressure are detected.

In the variable resistor VR0, a resistance division ratio of the RP1 side and the RP4 side can be adjusted mechanically by, for example, a dial or the like. For example, when there exists a DC offset component in the output of the bridge circuit, due to production errors and the like of RP1 to RP4, this offset voltage is also amplified by an amplification circuit AMP, and thus the effective input voltage range of the ADC becomes small. Therefore, in order to make this DC offset component close to zero, a resistance division ratio of VR0 is adjusted so that the output of the bridge circuit become close to zero, in the state where the external pressure of RP1 to RP4 is zero.

However, in this case, it is necessary to arrange the variable resistor VR0 as an external part, and it becomes an obstacle to miniaturization, and the part costs increase. In addition, because it is necessary to perform the adjustment of the resistance division ratio of the variable resistor VR0 by a manual operation, the adjustment costs increase, and further, because it is a mechanical adjustment, there is a fear that reliability is lost by fluctuations by vibration and the like. Accordingly, for example, it is considered to use the technology of the Patent Document 1.

FIG. 15 is a circuit diagram showing an example of another configuration in the semiconductor pressure sensor device that has been examined as a premise of the present invention, and it reflects the technology of Patent Document 1 mentioned above. The semiconductor pressure sensor device shown in FIG. 15, in the same manner as in FIG. 14, four pressure sensor elements RP1 to RP4 that configure a bridge circuit, and an offset adjustment circuit OFC_B is inserted between RP1 and RP4. The offset adjustment circuit OFC_B includes five external resistors RE11 to RE15 connected in parallel, and, four external resistors RE12 to RE15 among these are connected to between RP1 and RP4 through respective switches SW12 to SW15. The potential difference between a connection node of this OFC_B and RP4, and a connection node of RP2 and RP3 is amplified by the amplification circuit AMP.

Further, the semiconductor pressure sensor device of FIG. 15 includes a processor (microcomputer and the like) MCU as a data processing device. The MCU includes an analog-digital conversion unit ADC and an information processing unit PRC, and calculates a pressure value from the output of the amplification circuit AMP mentioned above. Furthermore, the MCU controls the ON/OFF of SW12 to SW15 based on the ON/OFF information of SW12 to SW15 stored beforehand in an external EEPROM. In the EEPROM, the ON/OFF information of SW12 to SW15 at the moment when the offset voltage of the bridge circuit comes closest to zero by tests in the state where the pressure is zero is stored beforehand.

However, in this case, since the offset adjustment circuit OFC_B has the configuration where not the resistance division ratio such as FIG. 14 but the resistance value only for the RP1 side is adjusted, in some cases, it is expected that the offset adjustment itself becomes difficult. In addition, since the adjustment is made with the combined resistance by the parallel connection, it is difficult to make the stepping width of the adjustment constant, and there is a fear that a highly precise offset adjustment cannot be performed sufficiently. Furthermore, in order to perform the offset adjustment at a step size, for example, 2Ω, it is of course necessary to use the respective external resistors RE11 to RE15 whose absolute value precision and relative value precision are high. Then, the increase of the part costs is concerned about. In other words, in the offset adjustment circuit in the case of FIG. 15, since the resistance value of the offset adjustment circuit between RP1 and RP4 is changed, by selecting SW12 to SW15, and it is equivalent to a fact that the resistance values of RP1 and RP4 of the pressure sensor are changed, and a problem occurs that the sensitivity (output voltage value) of the pressure sensor to the pressure value is changed. When the sensitivity of the pressure sensor to the pressure value is changed by adjusting an offset in this manner, it becomes necessary to adjust also the gain of the amplification circuit at the latter stage.

On the other hand, in order to plan the reduction of the package area of the respective external resistors RE11 to RE15 and the reduction of the procurement costs of such external parts, it can be considered to form RE11 to RE15 on a semiconductor chip in the processor MCU. However, in the resistors formed on a semiconductor chip, the relative value precision can be increased, but, the absolute value precision is, for example, around ±20%. In order to increase the absolute value precision, resistor trimming by, for example, laser trimming or diode zapping and the like is necessary. If an equivalent resistance value of around 2 ohms ($\Omega$) on a semiconductor chip is obtained, it is necessary to form a lot of resistors whose design values are, for example, several ten ohms ($\Omega$) to several hundred ohms ($\Omega$), and thus the chip area may become too large. In addition, if the trimming of the absolute value precision is performed, the adjustment cost thereof becomes necessary. Furthermore, when the specifications (bridge resistance value) and the like of the external pressure sensor are changed, in some cases, it is necessary to review each resistance value of the offset adjustment circuit OFC_B, and it becomes necessary to change the semiconductor chip. According to the foregoing, it is not practical to form the offset adjustment circuit OFC_B as shown in FIG. 15 in the processor MCU.

The present invention has been made in consideration of the above-mentioned issues, and one of the objects thereof is to provide a semiconductor pressure sensor device with low cost.

The typical ones of the inventions disclosed in this application will be briefly described as follows.

A semiconductor pressure sensor device according to one embodiment of the present invention includes a resistor for pressure detection that is configured in the shape of a bridge circuit, and an offset adjustment resistor that is inserted to one opened node of four nodes in this bridge circuit, and an internal resistor circuit that is arranged in parallel with this offset adjustment resistor, and formed on a semiconductor chip. This internal resistor circuit includes a plurality of switches, and a plurality of internal resistors whose own combined resistance value is designed to have a sufficiently larger order than the offset adjustment resistor, or, for example, an order that is larger than one digit or more; and it is configured so that an optional voltage can be outputted according to a selection signal of switches from the voltage range at both ends of the offset adjustment resistor. More concretely, the voltage at both ends of the offset adjustment resistor is divided by a plurality of internal resistors, and by use of the plurality of internal resistors, a voltage to make the partial pressure ratio corresponding to the selection signal of switches can be outputted.

When such a configuration is used, by a difference of the resistance values between the offset adjustment resistor and the internal resistor, the offset adjustment resistor mainly determines an adjustment range of the offset voltage, and the internal resistor circuit selects and outputs an optional voltage in this adjustment range. In this case, the precision of the adjustment range of the offset voltage depends on the absolute value precision of the offset adjustment resistor, and a resolution precision of this adjustment range depends on the relative value precision of the plurality of internal resistors. Therefore, the plurality of internal resistors can be formed on a semiconductor chip whose absolute value precision is low but a high relative value precision is easily achievable, and accordingly, it is possible to realize a low cost semiconductor pressure sensor device in a viewpoint such as the procurement costs and the packaging costs of external parts.

Further, in the semiconductor pressure sensor device according to one embodiment of the present invention, in the configuration mentioned above, the internal resistor circuit is included in an information processing device such as a processor or a data processing device. This information processing device includes, in addition to the internal resistor circuit, an amplification circuit that differentially amplifies an output voltage of this internal resistor circuit and an output voltage provided from another node in the bridge circuit (pressure sensor) mentioned above, and an A/D conversion circuit to convert the output thereof, and a processor that processes this converted value and calculates the pressure, and the like.

By use of such a configuration, it is possible to perform an offset adjustment with the internal resistor circuit by an automatic program processing using a processor. In other words, by the automatic program processing with the processor, the switches of the internal resistor circuit are set, and the output of the A/D conversion circuit at the moment is determined, thereby making possible to automatically search for a set value of the switches that can make the offset smaller. In this manner, it is possible to reduce processing costs and the like accompanying the offset adjustment.

By use of the semiconductor pressure sensor device and the data processing device according to one embodiment of the present invention, it is possible to reduce the costs.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that, components having the same function are denoted by the same reference symbols throughout the drawings for describing the embodiment, and the repetitive description thereof will be omitted. In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

First Embodiment

Figure 1:
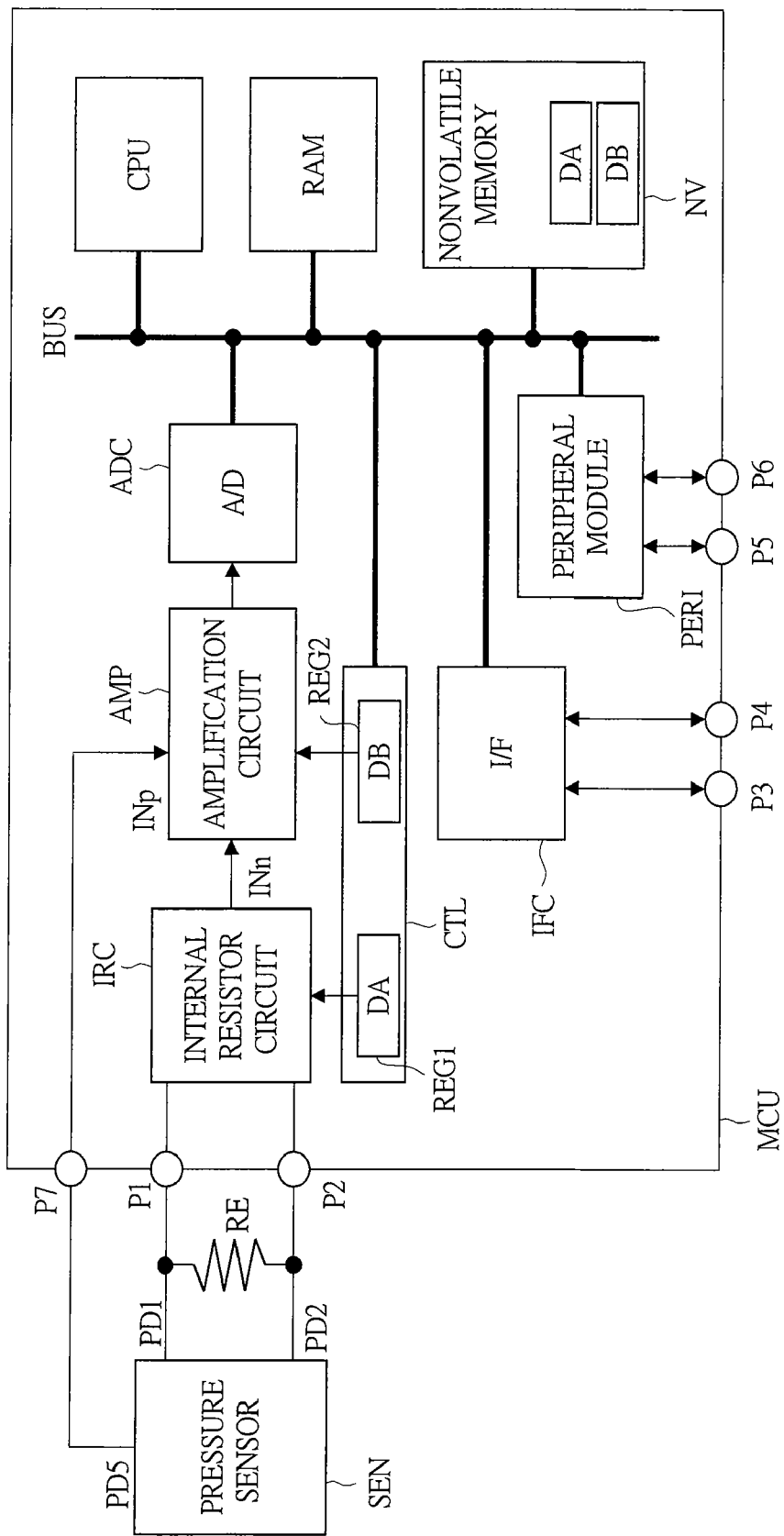
FIG. 1 is a block diagram showing an example of a configuration of a semiconductor pressure sensor device according to a first embodiment of the present invention.
Figure 2:
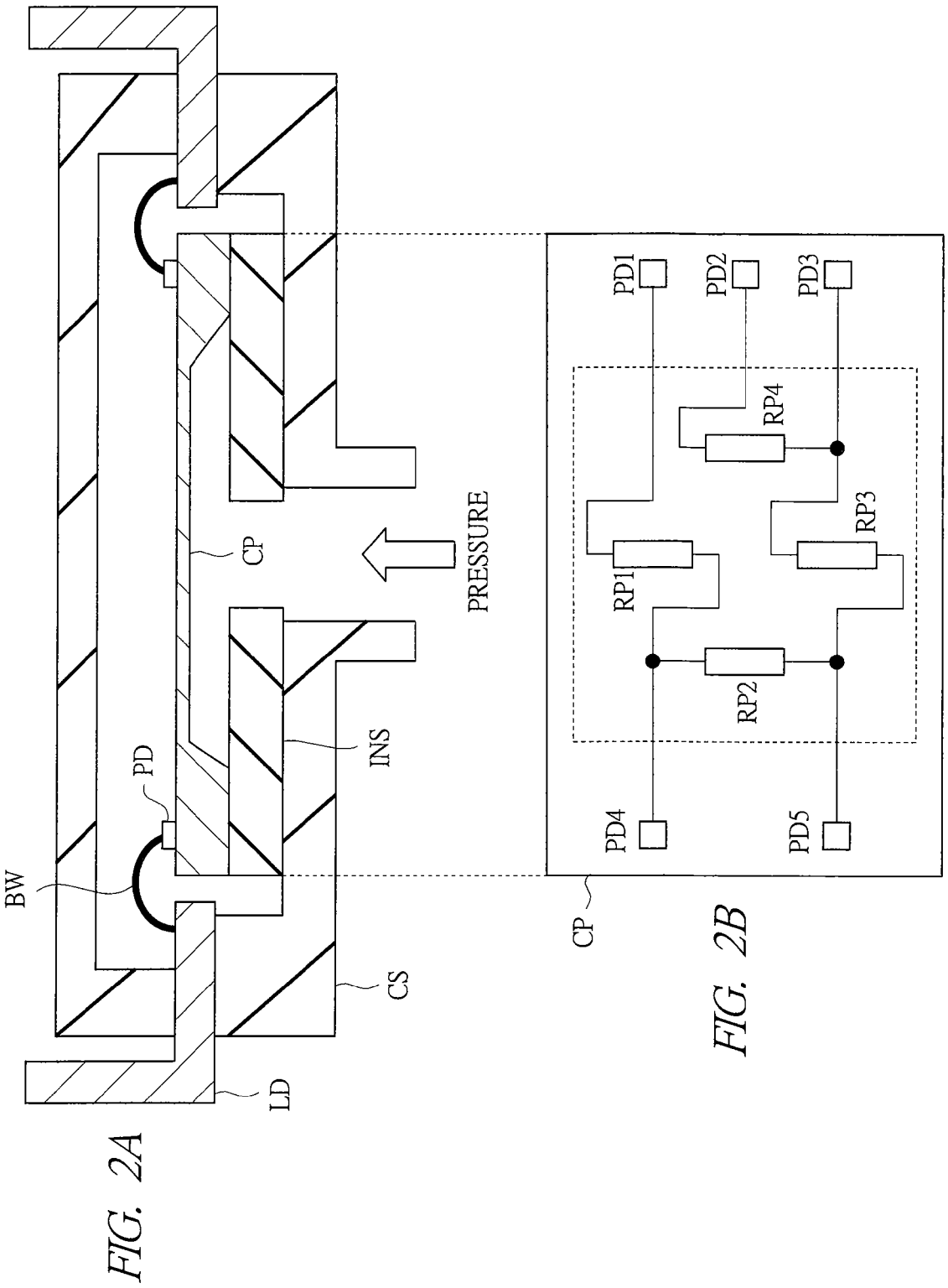
FIG. 2A is a whole cross-sectional view of a configuration example of a pressure sensor in FIG. 1.
FIG. 2B is a plan view of a semiconductor chip to become main parts of the configuration example of a pressure sensor in FIG. 1.

FIG. 1 is a block diagram showing an example of a configuration of a semiconductor pressure sensor device according to a first embodiment of the present invention. FIGS. 2A and 2B show a configuration example of a pressure sensor SEN in FIG. 1, where FIG. 2A is a whole cross-sectional view, and FIG. 2B is a plan view of a semiconductor chip CP to become the main part thereof. The semiconductor pressure sensor device shown in FIG. 1 is configured by the pressure sensor SEN, a processor (microcomputer and the like) MCU as a data processor, and an external resistor RE and so forth.

The pressure sensor SEN, as shown in FIGS. 2A and 2B, has a configuration where the semiconductor chip CP is stored in a case CS made of plastic and the like. The semiconductor chip CP, as shown in FIG. 2B, includes piezoresistors RP1 to RP4 formed at four sides, respectively. In the peripheral region of the region where RP1 to RP4 are formed, pads PD1 to PD5 are formed, and as shown in FIG. 2A, with regard to the thickness of the semiconductor chip CP, the region where the RP1 to RP4 are formed is formed to be thinner than the peripheral region thereof.

In the semiconductor chip CP of FIG. 2B, one end of RP1 is wire-connected to PD1, and the other end is wire-connected to PD4 and also wire-connected to one end of RP2. The other end of RP2 is wire-connected to PD5 and it is wire-connected to one end of RP3, and the other end of RP3 is wire-connected to PD3 and also wire-connected to one end of RP4. The other end of RP4 is wire-connected to PD2. In other words, in RP1 to RP4, the connection node of RP1 and RP4 becomes a bridge circuit that is opened by PD1 and PD2.

Figure 14:
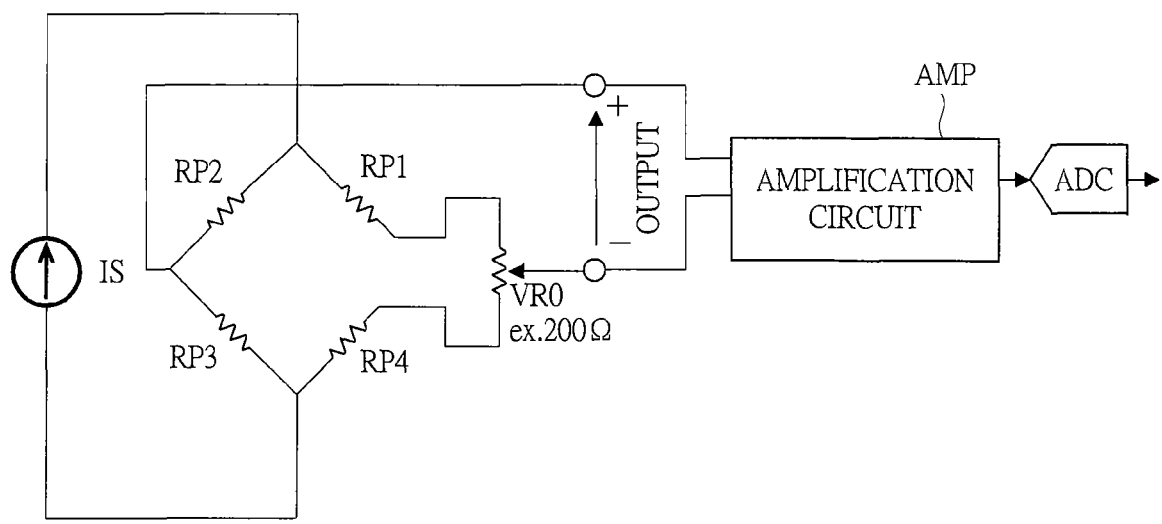
FIG. 14 is a circuit diagram showing an example of a configuration in a semiconductor pressure sensor device that has been studied as a premise of the present invention.
Figure 15:
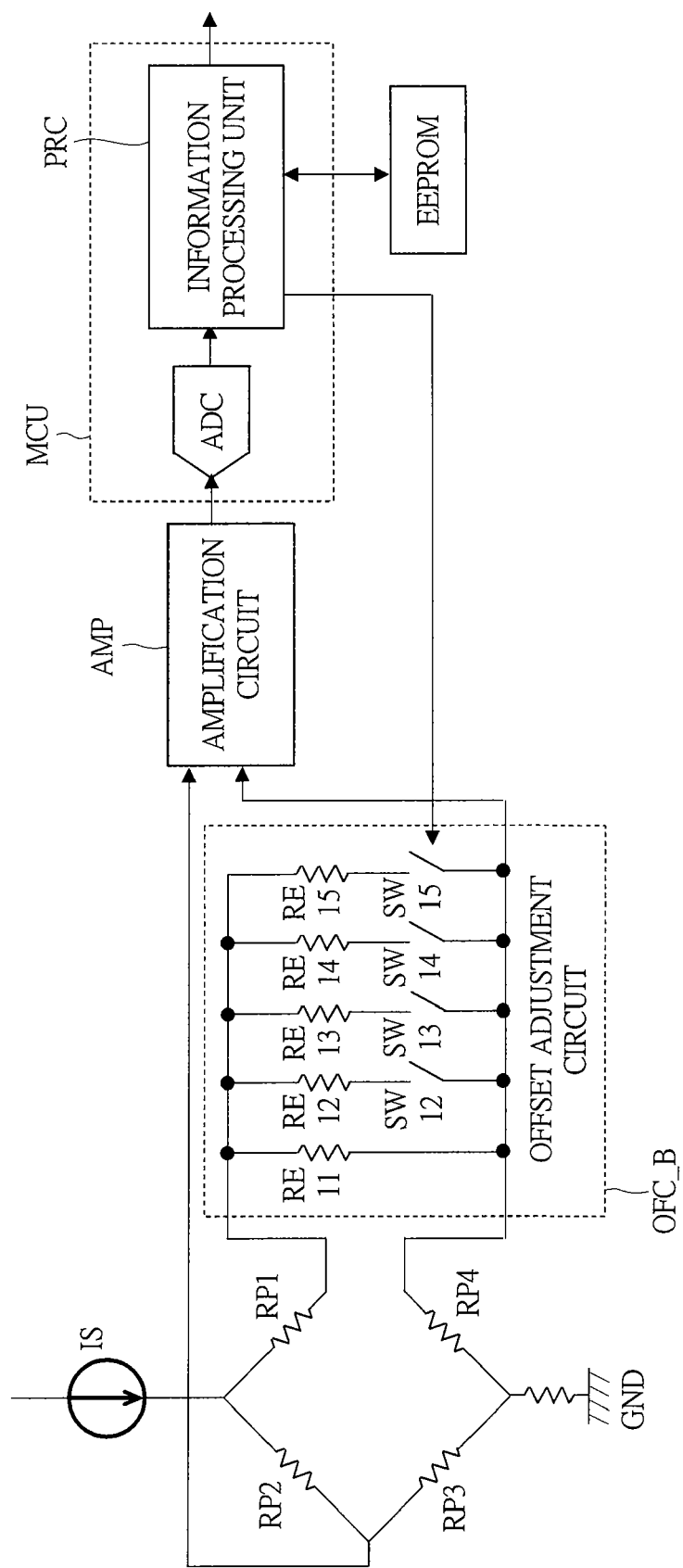
FIG. 15 is a circuit diagram showing an example of another configuration in the semiconductor pressure sensor device that has been examined as the premise of the present invention.

Such a semiconductor chip CP is, as shown in FIG. 2A, attached to an insulation member INS such as a glass pedestal and the like and it is stored in the case CS together with the insulation member INS. Further, respective pads PD1 to PD5 are connected to an external lead LD through a bonding wire BW. In addition, a pressure inlet port is arranged in the center of the case CS, and from this, pressure (atmospheric pressure) is applied. RP1 to RP4 on the semiconductor chip CP are distorted according to this pressure, and the respective resistance values are changed. Accordingly, when a constant current source is connected, for example, between PD4 and PD3, the potential difference that occurs between PD1 (PD2) and PD5 is read, an unbalance degree of this resistance value is calculated, and the pressure is calculated. But, as mentioned previously in FIG. 14 and the like, in such a bridge circuit, an offset voltage usually occurs, and accordingly, it is necessary to perform an adjustment to make the offset voltage close to zero by use of PD1 and PD2 beforehand.

In FIG. 1, the processor MCU is formed on a semiconductor substrate (or, a semiconductor chip) by a well-known CMOS semiconductor manufacturing method, and, it includes, for example, CPUs (Central Processing Units), a RAM (Random Access Memory), a nonvolatile memory NV, an analog-digital conversion unit ADC, an external interface unit IFC, a control block CTL, and a peripheral module PERI, and the like which are connected mutually through a bus BUS. The nonvolatile memory NV is a nonvolatile memory that can be written and erased electrically, and, for example, it is a flash memory, an EEPROM, a phase change memory, an MRAM (Magnetoresistive Random Access Memory), and the like.

The external interface unit IFC inputs and outputs desired data through external input and output terminals P3 and P4. Peripheral module PERI is not limited in particular, but, for example, a functional module generally included in a processor, e.g., a timer module and an LCD (Liquid Crystal Display) controller module and the like. Herein, the peripheral module PERI has a configuration that it can input and output desired data through external input and output terminals P5 and P6. Note that, while the processor MCU is usually realized by one semiconductor chip, in some cases, it is realized by a plurality of semiconductor chips like an MCP and the like.

Further, the processor MCU of FIG. 1 includes external input terminals P1, P2, and P7 respectively connected to the pads PD1, PD2, and PD5 of the pressure sensor SEN mentioned above, an internal resistor circuit IRC, and an amplification circuit AMP. The external resistor RE mentioned above is connected between P1 (PD1) and P2 (PD2). The internal resistor circuit IRC takes a part of the offset adjustment function to be mentioned in more details later herein, and has a function to output a specified electric potential according to a set value DA to the amplification circuit AMP as a signal INn, in a range between an electric potential of P1 and an electric potential of P2. An amplification circuit AMP amplifies a potential difference between the signal INp inputted from the external input terminal P7 and the signal INn from the IRC, and outputs the potential difference to the analog-digital conversion unit ADC. The ADC converts the analog signal from the AMP into a digital signal, and the CPU receives this digital signal and performs a specified processing, thereby calculating the pressure.

In addition, the control block CTL includes, for example, two registers REG1 and REG2, and retains the set value DA of the internal resistor circuit IRC mentioned above in REG1, and retains the set value DB of the amplification circuit AMP in REG2. These set values are loaded (set) by the nonvolatile memory NV through the bus BUS at the time of initialization of the processor MCU to execute an initial program in the case of, for example, a power-on reset of the processor MCU and pressure measurement. In addition, the set value DB of the amplification circuit AMP is a set value to adjust, for example, the amplification rates (in other words, sensitivity) of the AMP and the like.

Figure 3:
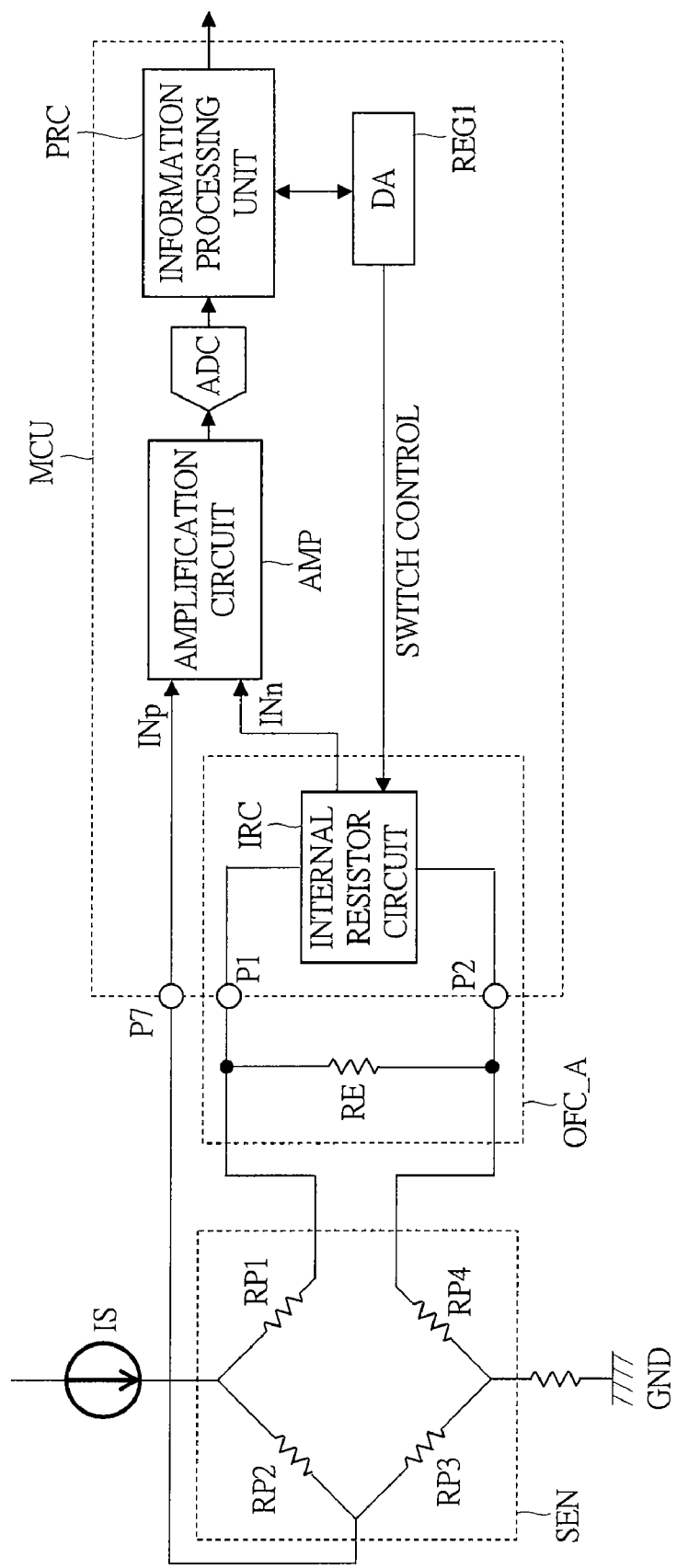
FIG. 3 is a schematic diagram showing a configuration example of main parts related to an offset adjustment in the semiconductor pressure sensor device of FIG. 1.

In such a configuration, a main feature of the semiconductor pressure sensor device of the first embodiment is that the offset voltage of the pressure sensor SEN is adjusted by a combination of the external resistor RE and the internal resistor circuit IRC arranged in the processor MCU. FIG. 3 is a schematic diagram showing a configuration example of main parts related to the offset adjustment in the semiconductor pressure sensor device of FIG. 1.

The semiconductor pressure sensor device of FIG. 3 includes: a pressure sensor SEN formed by piezoresistors RP1 to RP4; and a processor MCU; and an external resistor RE. A connection node of RP1 and RP2 is connected to a constant current source IS, and a connection node of RP3 and RP4 is connected to a ground voltage node GND. As mentioned above, to the opened end formed by one end of RP1 (external input terminal P1) and one end of RP4 (external input terminal P2), the external resistor RE is connected, and further, an internal resistor circuit IRC in MCU is connected in parallel to this. The external resistor RE and the internal resistor circuit IRC become an offset adjustment circuit OFC_A. Herein, among the external resistors RE, one whose absolute value precision is high is used.

In the MCU, the amplification circuit AMP amplifies the potential difference between the signal INn to become the output of the internal resistor circuit IRC and the signal INp inputted through the external input terminal P7 from the connection node of RP2 and RP3, and outputs the same to the analog-digital conversion unit ADC. The digital signal after this conversion is processed in an information processing unit PRC corresponding to a CPU and the like, thereby detecting the pressure. In addition, the information processing unit PRC writes the set value DA of the internal resistor circuit IRC into the register REG1.

Figure 4:
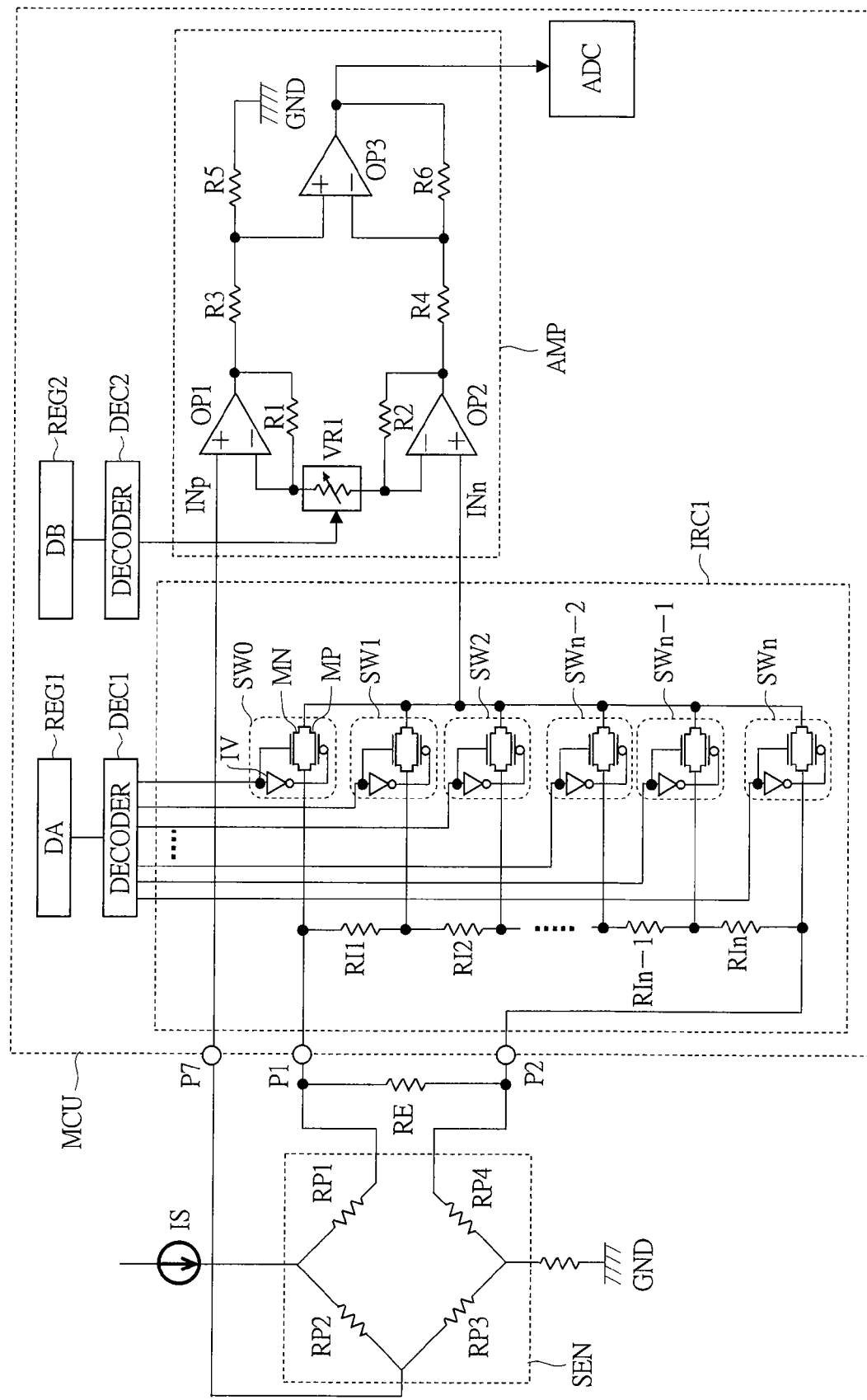
FIG. 4 is a circuit diagram showing a detailed configuration example of the circumference of an internal resistor circuit in the semiconductor pressure sensor device of FIG. 3.

FIG. 4 is a circuit diagram showing a detailed configuration example of the circumference of the internal resistor circuit IRC in the semiconductor pressure sensor device of FIG. 3. An internal resistor circuit IRC1 shown in FIG. 4 is configured by N pieces of internal resistor elements (hereinafter, referred to as internal resistors) RI1 to RIn connected in series between the external input terminals P1 and P2, and (N+1) pieces of switch elements (hereinafter, referred to as switches) SW0 to SWn. The SW0 to SWn select a voltage signal according to the set value DA mentioned above from the voltage signal of P1, the voltage signal of P2 and the voltage signal of each connection node in RI1 to RIn, and transmits it to the amplification circuit AMP as a signal INn. The set value DA set to REG1 is not limited in particular, but it is decoded by a decoder DEC1, and is supplied to SW0 to SWn, thereby controlling the ON/OFF operations of SW0 to SWn. Herein, as the respective switches SW0 to SWn, a so-called CMOS switch including a PMOS transistor MP, an NMOS transistor MN, and an inverter circuit IV to drive the transistors to ON or OFF at the same time is used, however, the present invention is not always limited to the CMOS switch. Note that, with regard to the respective switches SW0 to SWn, it is preferable that an ON resistance (voltage drop) and a voltage dependence of the ON resistance are as small as possible, and from this point of view, it is preferable to use the CMOS switch.

The potential difference between the signal INn transmitted by any of the respective switches SW0 to SWn and the signal INp inputted through the external input terminal P7 is amplified by the amplification circuit AMP. The amplification circuit AMP is not limited in particular, but, for example, it is configured by so-called instrumentation amplifier that is configured by operational amplifier (op-amp) circuits OP1 to OP3, resistors R1 to R6, and a variable resistor VR1. OP1 amplifies the signal INp inputted into an (+) input node, and OP2 amplifies the signal INn inputted into an (+) input node, and OP3 differentially amplifies the output of OP1 and the output of OP2. In addition, as the first-stage OP1 and OP2 of the amplification circuit AMP, an amplification circuit whose input current is very small and ignorable such as a CMOS op-amp and a J-FET (junction FET) op-amp is preferable. In other words, since a series resistance that is changed by the selection of the switches SW0 to SWn is provided, in the former stage of an amplifier input, if the amplifier input current is large, a DC offset occurs by the voltage drop, and it is preferable to use the CMOS op-amp and the J-FET op-amp whose amplifier input current is near zero.

R1 is arranged between an output node of OP1 and a (−) input node, and R2 is arranged between an output node and a (−) input node of OP2. R3 is arranged between the output node of OP1 and a (+) input node of OP3, and R4 is arranged between the output node of OP2 and a (−) input node of OP3. R5 is arranged between the (+) input node of OP3 and a ground voltage node GND of OP3, and R6 is arranged between the output node and a (−) input node of OP3. In addition, VR1 is arranged between the (−) input node of OP1 and the (−) input node of OP2.

Normally, respective resistance values are set as R1=R2, R3=R4, and R5=R6, and a voltage Vop3 of the output node of OP3 at this moment is expressed by the following equation (1).

$$Vop3 = (INp - INn) * (1 + 2 \cdot R1/VR1) \cdot (R5/R3) \quad (1)$$

Herein, as for the resistance value of VR1, the set value DB of the register REG2 may be set by, although it is not limited particularly, a signal decoded by the decoder DEC2 as mentioned above, and thus, an amplification rate of the amplification circuit AMP may be set variable as found from the equation (1).

In this configuration of FIG. 4, when the offset of the pressure sensor SEN is to be adjusted, in a condition that the external pressure to the pressure sensor SEN is made zero, the switch by which the potential difference of the signal INp and the signal INn becomes nearest to zero is selected, from the respective switches SW0 to SWn in the internal resistor circuit IRC1. Herein, when the resistance values of the respective internal resistors RI1 to RIn in IRC1 are made all same (or approximately same), it becomes possible to equally divide (or almost equally divide) the section between the voltage of P1 and the voltage of P2 to become the both end voltages of the external resistor RE by a step width corresponding to the number (n) of RI1 to RIn, and select an optional voltage therefrom. For example, when it is set that n=16, the section between the voltage of P1 and the voltage of P2 is divided into 16 parts, and any one of 17 pieces of voltages including the voltage of P1 and the voltage of P2 can be selected. The more the number (n) of the internal resistors RI is increased, the more the resolution of the step width is increased.

By use of such a configuration, it is possible to attain, for example, the following effects typically. First, as a first effect, by use of the resistors whose absolute value precision is equivalently high, it is possible to adjust the division ratio thereof precisely. As mentioned above, it is easy for the internal resistors RI formed in the semiconductor chip to realize a high relative value precision (for example, 3 to 5%), but it is difficult to realize a high absolute value precision. Therefore, in FIG. 4, as the external resistors RE, resistors whose absolute value precision is as high as, for example, several ten ohms to several hundred ohms are used, and the respective internal resistors RI1-RIn are designed so that the order of the combined resistance value thereof becomes sufficiently larger than the order of the resistance value of the resistors RE or become, for example, an order that is larger than the same by one digit or more (that is, several hundred ohms to several kilo-ohms).

Meanwhile, more preferably, when the external resistors RE are set for example several tens of ohms, the respective internal resistors are designed so as to become larger by two digits to three digits (that is, several kilo-ohms to several tens of kilo-ohms or above). Then, since the combined resistance value between the external input terminals P1 and P2 is determined when the external resistors RE become dominant, the absolute value precision can be improved, and there is little influence on the unevenness of the absolute value precision of the internal resistors RI. On the other hand, in the internal resistors RI, a high absolute value precision can be realized, and accordingly, it is possible to increase the precision of step width mentioned above (that is, the division ratio of the external resistors RE, in other words, the partial pressure ratio between P1 and P2).

As an example, for example, the standard resistance value of the respective piezoresistors RP1 to RP4 is set to 5 kΩ, and the constant current source IS is set to 0.533 mA, and the external resistors RE are set to 75Ω, and the respective internal resistors RI1 to RIn is set to 5 kΩ, and the number of the internal resistors is set to 16 (N=16). In this case, the voltage between P1 and P2 becomes about 20 mV ((0.533 mA/2)× 75Ω), and it is possible to adjust this section at a 1.25 mV step. Herein, it is assumed that the absolute value precision of the external resistors RE is ±1%, and the absolute value precision of the internal resistors RI is ±30%.

Then, the combined resistance value at the standard time between P1 and P2 becomes a parallel resistance of 75Ω and 80 kΩ, and it is 74.930Ω. In addition, the combined resistance value at maximum becomes a parallel resistance of (75× 1.01Ω) and (80 k×1.3Ω), and it is 75.695Ω. On the other hand, the combined resistance value at minimum becomes the parallel resistance of (75×0.99Ω) and (80 k×0.7Ω), and becomes 74.152Ω. Therefore, on the basis of the combined resistance value at the standard time, it is +1.02% at maximum, and −1.04% at minimum, and the influence of the absolute value precision of the internal resistors RI is only around 0.02 to 0.04%. In addition, for example, even in the case where calculations are made in the same manner with the resistance values of the respective internal resistors RI1 to RIn taken as 2 kΩ, the influence of the absolute value precision of the internal resistors RI is only around 0.05 to 0.10%.

Next, as a second effect, because the external resistors RE are used together, it is possible to correspond to the pressure sensor SEN of various specifications flexibly. In other words, for example, for pressure sensors SEN in which the bridge resistances are different, external resistors RE having the resistance values corresponding thereto may be provided, and the internal resistor circuit IRC1 itself in the processor MCU can be used in common. As the third point effect, in comparison with the case of the Patent Document 1 mentioned above and the Non-Patent Document 1, it is possible to reduce the procurement costs or the packaging costs of external parts, and accordingly, it is possible to realize a low cost semiconductor pressure sensor device.

In addition, herein, while the external resistors RE are used, the external resistors RE may be formed in the processor MCU as internal resistors whose absolute precision is secured by use of trimming and the like. In this case, although the second effect mentioned above cannot be attained, it is possible to attain a third effect further. Of course, adjustment costs of the absolute precision arising from the trimming and the like certainly increase, but only one internal resistor corresponding to the external resistors RE may have to be adjusted, and consequently, the increase of costs may be minor.

Figure 5:
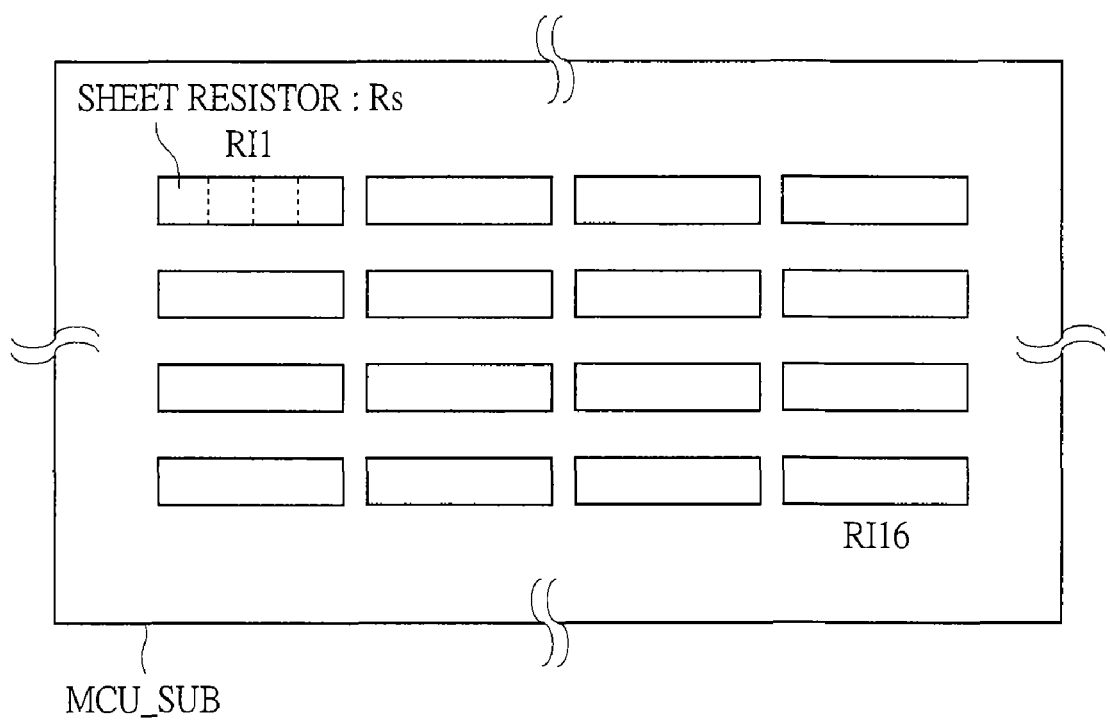
FIG. 5 is a plan view showing a layout configuration example of the internal resistors in the internal resistor circuit of FIG. 4.

FIG. 5 is a plan view showing a layout configuration example of the internal resistors RI in the internal resistor circuit IRC of FIG. 4. The internal resistors RI may be realized by use of, for example, a resistor of a diffusion layer formed in a semiconductor substrate, a resistor of polysilicon layer formed on a semiconductor substrate. In particular, in order to realize a high resistance value such as several kΩ easily in a small area, it is preferable to use a polysilicon layer. FIG. 5 shows an example of a chip layout in which 16 internal resistors RI1 to RI16 are formed by use of a polysilicon layer.

In FIG. 5, internal resistors RI1 to RI16 having the polysilicon layer are formed in a matrix of four rows and four columns on an upper layer of a semiconductor substrate MCU_SUB of the processor MCU. Each internal resistor RI uses four squares of the polysilicon layer with sheet resistance of, for example, Rs=500 Ω/□ to have resistance value of 2 kΩ. In addition, with regard to RI2 to RI15 whose positions are not shown, for example, they may be arranged as to draw an S letter in the row direction, and may be arranged as to draw an S letter in the column direction. In addition, although its illustration is omitted, a switch (CMOS switch) SW shown in FIG. 4 is formed on the semiconductor substrate MCU_SUB, in the part right under a region where the polysilicon layer is formed. By arranging the polysilicon layer regularly and closely in this manner, it is possible to realize such a relative value precision as, for example, 3 to 5%.

As described above, by use of the semiconductor pressure sensor device according to the first embodiment, typically, it is possible to realize the low cost and the like.

Second Embodiment

Figure 6:
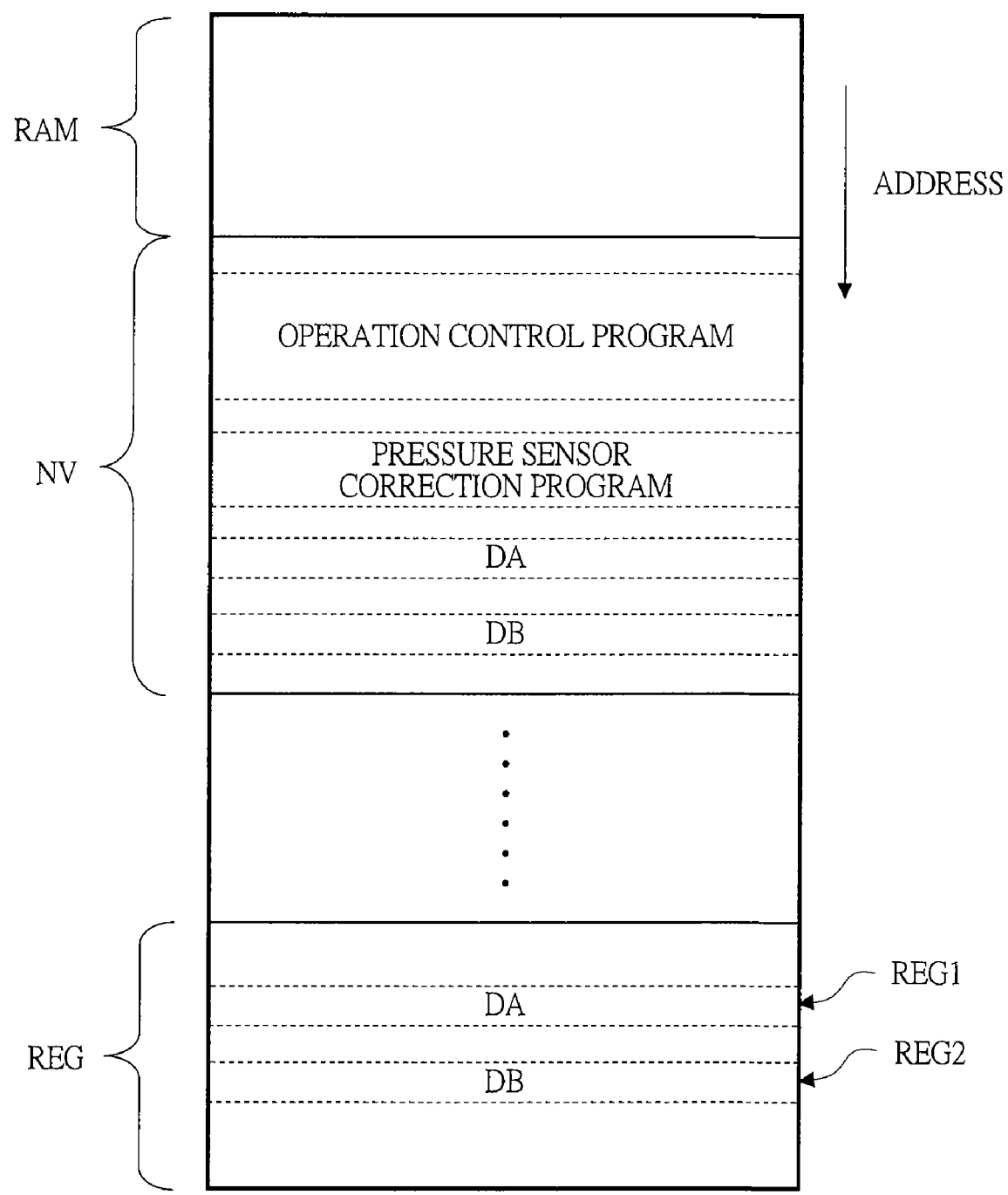
FIG. 6 is an explanatory diagram showing an example of an address space included in the processor of FIG. 1, in a semiconductor pressure sensor device according to a second embodiment of the present invention.

In a second embodiment, function of automatically performing the offset adjustment mentioned in the first embodiment will be described. FIG. 6 is an explanatory figure showing an example of the address space included in the processor MCU of FIG. 1 in a semiconductor pressure sensor device according to the second embodiment of the present invention.

The processor MCU of FIG. 1, as shown in FIG. 6, includes, for example, an address space of the RAM, an address space of the nonvolatile memory NV, address spaces of various registers REG and the like. The address space of the nonvolatile memory NV (memory region of NV) includes: an operation control program at the moment to perform a pressure measurement by use of the pressure sensor SEN; a pressure sensor correction program at the moment to automatically perform the offset adjustment mentioned above and the gain adjustment of the amplification circuit; and the set values DA and DB mentioned above and the like are included. In addition, in the address space of the various registers REG (memory region of REG), the set values DA and DB memorized in the registers REG1 and REG2 in the control block CTL of FIG. 1 are included.

Figure 7:
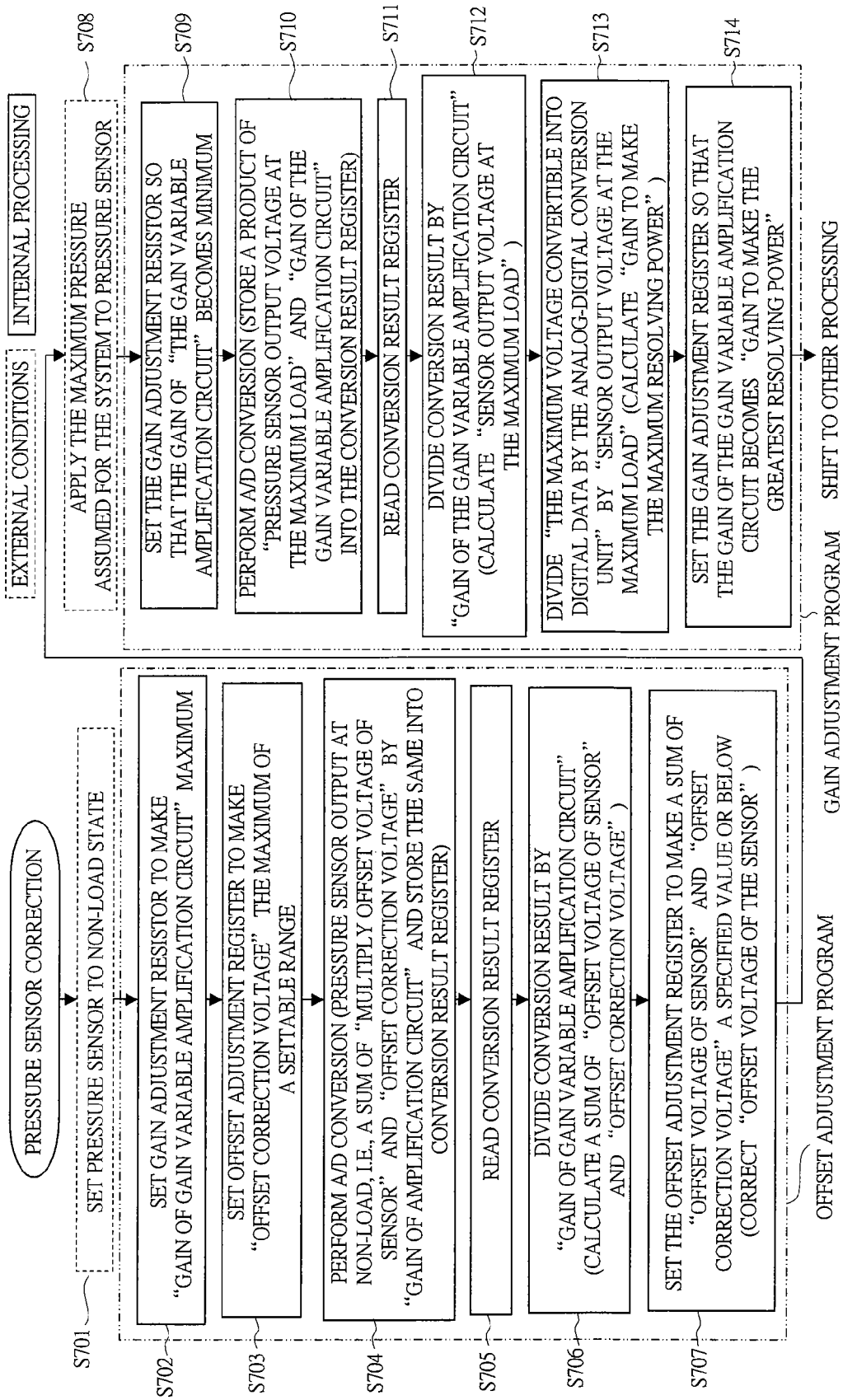
FIG. 7 is a flow chart showing an example of processing contents of a pressure sensor correction program in FIG. 6.
Figure 8:
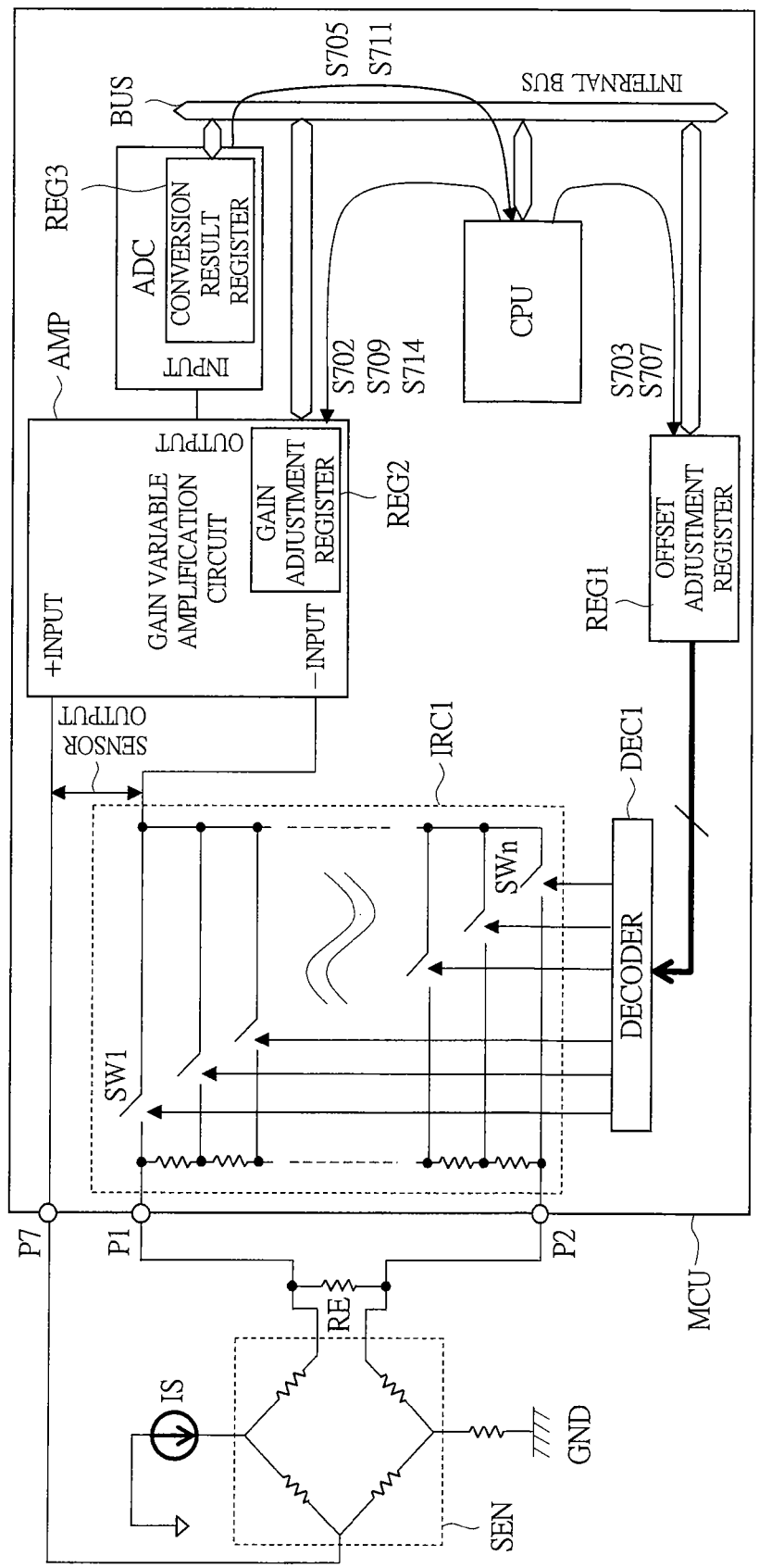
FIG. 8 is a supplementary diagram of FIG. 7, and also is a schematic diagram of a semiconductor pressure sensor device having the configuration examples of FIG. 1 and FIG. 4.

FIG. 7 is a flow chart showing an example of processing contents of the pressure sensor correction program of FIG. 6. FIG. 8 is a supplementary diagram of FIG. 7, and it is a schematic diagram of a semiconductor pressure sensor device having the configuration examples of FIG. 1 and FIG. 4. The configuration example shown in FIG. 8 shows extracted main parts in the configuration examples of FIG. 1 and FIG. 4. Herein, a conversion result register REG3 for storing a conversion result of the analog-digital conversion unit ADC is shown, and the configuration example is shown in which an output of the offset adjustment register REG1 is set through the decoder DEC1 to each switch SW in the internal resistor circuit IRC1. Hereinafter, the processing contents of FIG. 7 will be described with reference to FIG. 8.

As shown in FIG. 7, the pressure sensor correction program includes an offset adjustment program and a gain adjustment program. When performing the offset adjustment, first, the pressure sensor SEN is set into a non-load state (S701), and the offset adjustment program is run. In the offset adjustment program, first, the CPU sets the maximum value of a gain that the amplification circuit (gain variable amplification circuit) AMP can take to the gain adjustment resistor REG2 (S702). Next, the CPU sets the offset adjustment register REG1 so that the offset correction voltage of the internal resistor circuit IRC1 becomes the maximum of the settable range (S703). In other words, in the case of the configuration example of FIG. 8, SW1 or SWn in the internal resistor circuit IRC1 is set to be ON.

Successively, the CPU makes the analog-digital conversion unit ADC carry out the A/D conversion (S704). In this manner, to the conversion result register REG3, ("the offset voltage of the sensor"+"the offset correction voltage")×"the gain of the amplification circuit" to become the measurement result of the pressure sensor SEN in its non-load state is stored. In addition, the offset voltage of the sensor means the offset voltage that occurs in a state without the internal resistor circuit IRC1. Subsequently, the CPU reads the conversion result register REG3 (S705), and divides this read conversion result by "the gain of the amplification circuit" (S706). In this manner, a value of ("the offset voltage of the sensor"+"the offset correction voltage") is calculated.

Finally, the CPU searches for the set value DA of the offset adjustment register REG1 with which the measurement value of the offset component to become ("the offset voltage of the sensor"+"the offset correction voltage") becomes a specified value or below (ideally zero), and stores the set value DA into REG1 (S707). In other words, if the adjustment range of the offset correction voltage by the internal resistor circuit IRC1 is −10 mV to +10 mV, and the measurement value of the offset component in the condition where the switch SW1 is turned ON is −10 mV, when the switch SW positioned in the vicinity of the center (n/2) of SW1 to SWn is tuned ON, the offset component must become almost zero. In this manner, since the switch to set off the offset component most can be determined, according to the measurement value of the offset component, a setting to turn ON the switch SW is performed.

In this manner, by mounting the offset adjustment program in the processor MCU, it is possible to automatically perform the offset adjustment. For example, there is a fear that the offset component may be changed due to temperature environments and the like in the pressure sensor formed by the piezoresistors. When such an automatic offset adjustment program is used, even when temperature environment is changed, it is possible to easily perform the automatic offset correction of the pressure sensor by an order from a user or at initialization upon power supply to the system and the like, and it is possible to improve the measurement precision for the whole system.

Further, in the offset adjustment program shown in FIG. 7, the switch SW to set off the offset component most is determined, according to the measurement value of the offset component, to further consider errors or the like, a process to turn ON the switch SW concerned, and switches SW before and after the concerned switch, and confirm the measurement results of those switches may be added. In addition, the offset adjustment program shown in FIG. 7 is of course not limited to this, but it may be a program in which the CPU automatically searches for the set value DA at which the value of REG3 (that is, the offset component) becomes smaller than a specified value (in other words, it becomes almost zero), by use of the set value DA and the value of the conversion result resistor REG3 at the moment.

For example, a method may be used in which the switches SW1 to SWn are turned ON sequentially, and the switch SW at which the measurement value of the offset component is the smallest is taken as a solution. But, when the number of the switches SW is increased, the offset adjustment takes much time, and accordingly, from the viewpoint of the adjustment time, a processing flow to narrow down the switches SW to be turned ON by calculations as shown in FIG. 7 becomes useful.

After the completion of the offset adjustment in the manner as described above, as shown in FIG. 7, a gain adjustment of the amplification circuit AMP is performed. When the gain adjustment is performed, first, the maximum pressure that is assumed for the system is applied to the pressure sensor SEN (S708), and the gain adjustment program is run. In the gain adjustment program, first, the minimum value of the gain that the amplification circuit (gain variable amplification circuit) AMP can take is set by the CPU to the gain adjustment resistor REG2 (S709). Next, the CPU makes the analog-digital conversion unit ADC carry out the A/D conversion (S710). Thereby, to the conversion result register REG3, ("the pressure sensor output voltage at the maximum load")×"the gain of the amplification circuit" to become the measurement result of the pressure sensor SEN in its maximum load state is stored.

Subsequently, the CPU reads the conversion result register REG3 (S711), and divides this read conversion result by "the gain of the amplification circuit" (S712). In this manner, the value of "the sensor output voltage at the maximum load" is calculated. Thereafter, the CPU calculates "the maximum voltage that analog-digital conversion unit ADC can convert into digital data"÷"the sensor output voltage at the maximum load" (S713). Thereby, "the gain to have the maximum resolution" (in other words, the gain of the amplification circuit AMP in which the input voltage range of the ADC is maximized" is calculated. Finally, the CPU sets "the gain to have the greatest resolution" to the gain adjustment register REG2 (S714).

As mentioned above, by mounting the gain adjustment program in the processor MCU, it is possible to automatically perform the gain adjustment to maximize the resolution of the pressure measurement. Meanwhile, about the offset adjustment program mentioned above, the processing to make the pressure sensor into its non-load state at S701 beforehand is required, but, since it is easy to realize this mechanism inside the system, for example, in a manometer or the like, the mechanism may be carried out in connection with this processing of S701. On the other hand, in this gain adjustment program, the processing to impress the maximum pressure to the pressure sensor at S708 beforehand is required, but it is not easy to arrange this mechanism in the inside of the system, therefore an external mechanism may be used at necessity.

In addition, it will be easily understood that the offset adjustment program the same operation even when they and the gain adjustment program can perform are configured with an exclusive logical circuit.

Third Embodiment

Figure 9:
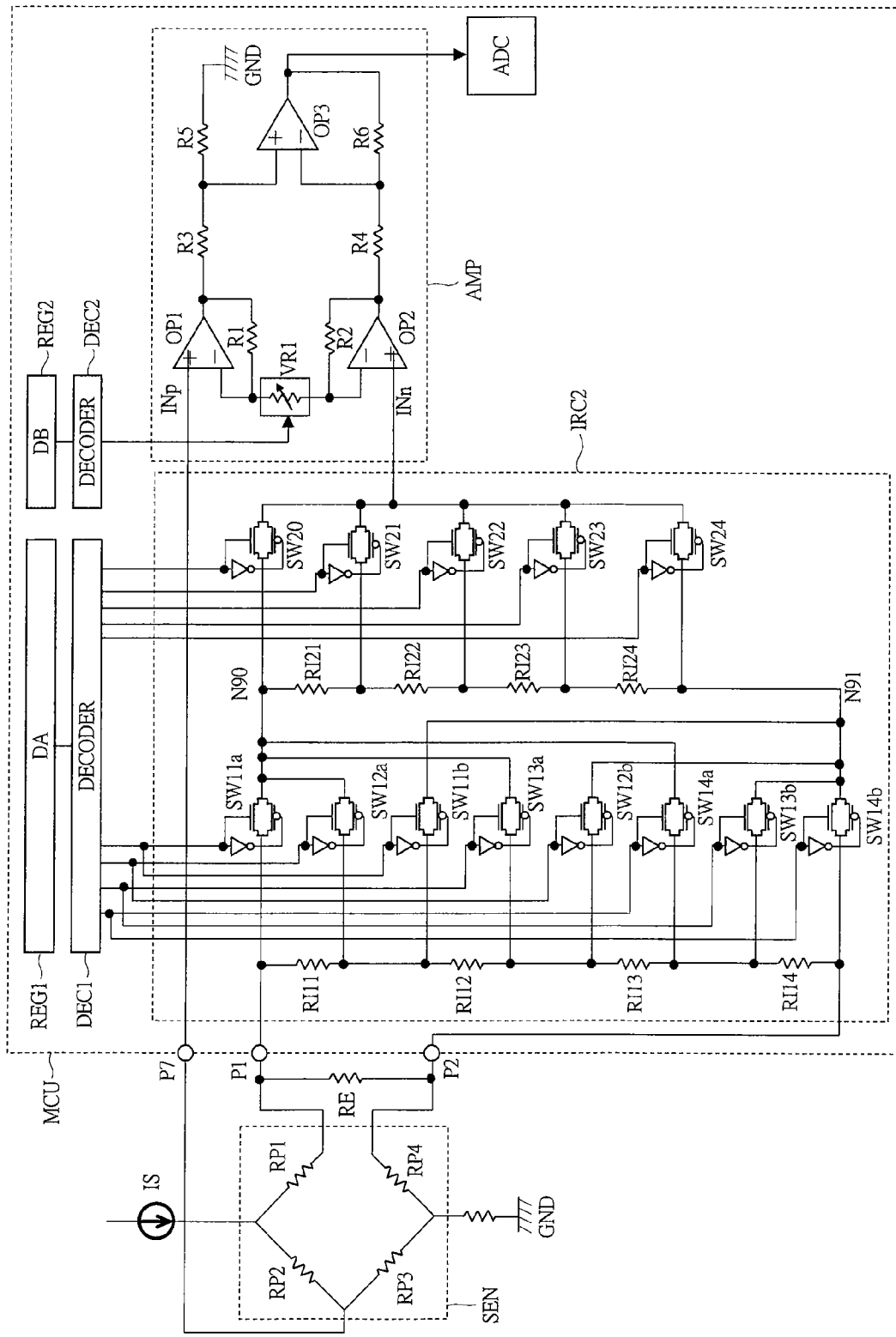
FIG. 9 is a circuit diagram showing a detailed configuration example of the circumference of the internal resistor circuit of FIG. 1 in a semiconductor pressure sensor device according to a third embodiment of the present invention.

In a third embodiment, a modified example of the internal resistor circuit IRC1 of FIG. 4 mentioned in the first embodiment will be described. FIG. 9 is a circuit diagram showing a detailed configuration example of the circumference of the internal resistor circuit IRC of FIG. 1 in a semiconductor pressure sensor device according to the third embodiment of the present invention. The internal resistor circuit IRC2 shown in FIG. 9 is formed by, for example, four internal resistors RI11 to RI14, and eight switches (CMOS switches) SW11a to SW14a, SW11b to SW14b, and four internal resistors RI21 to RI24 and five switches (CMOS switches) SW20 to SW24.

The four internal resistors RI11 to RI14 are connected in series between the external input terminals P1 and P2. The eight switches SW11a to SW14a, SW11b to SW14b transmit a voltage between both ends of one of RI11 to RI14 to two nodes N90 and N91 respectively. For example, a voltage signal of one end of RI11 is transmitted to N90 through SW11a, and a voltage signal of the other end is transmitted to N91 through SW11b. In the same manner, voltage signals of one end of RI12, RI13, and RI14 are transmitted to N90 through SW12a, SW13a, and SW14a respectively, and voltage signals of the other end of RI12, RI13, and RI14 are transmitted to N91 through SW12b, SW13b, and SW14b respectively.

The four internal resistors RI21 to RI24 are connected in series between the nodes N90 and N91. The five switches SW20 to SW24 select whether the voltage signal of N90 or the voltage signal of N91 or the voltage signal of each connection node of RI21 to RI24 on the basis of the set value DA stored in the register REG1, and transmits it as the signal INn mentioned above to the amplification circuit AMP. In addition, the set value DA includes the selection information of SW11a to SW14a, and SW11b to SW14b mentioned above as well as the selection information (ON/OFF information) of the SW20 to SW24. In this case, one set in four sets including (SW11a, SW11b), (SW12a, SW12b), (SW13a, SW13b), and (SW14a, SW14b) is set ON.

In addition, Rn11 to Rn14 have the same resistance value respectively. RI21 to RI24 have the same resistance value respectively, and RI11 to RI14 and RI21 to RI24 may have the same resistance value or different resistance values respectively. In addition, the amplification circuit AMP in FIG. 9 has the same circuit configuration as that in FIG. 4, and amplifies the potential difference between the signal INn and the signal INp inputted through the external input terminal P7, and outputs the result thereof into the analog-digital conversion unit ADC. The amplification rate of this amplification circuit AMP can be set by the set value DB stored in the register REG2 as described previously in FIG. 4.

By use of such a configuration as shown in FIG. 9, in addition to the various effects mentioned in FIG. 4, it is possible to realize the offset adjustment of a high resolution in a small area. In other words, the voltage range of the section between the external input terminals P1 and P2 is divided into four equally by RI11 to RI14, and one of these four voltage ranges divided equally is selected, and the voltage range thereof can be divided into four equally by RI21 to RI24; and accordingly, the voltage range between the external input terminals P1 and P2 can be divided into 16 equally by the eight internal resistors RI and the 13 switches SW. In order to divide the voltage range into 16 equally in the configuration example of FIG. 4, 16 internal resistors RI and 17 switches SW are necessary.

Meanwhile, in FIG. 9, division of the first stage is carried out by four series resistors, and further, division of the second stage is carried out by four series resistors. Meanwhile, the present invention is not limited to these numbers of course. For example, it is possible to divide the voltage range between P1 and P2 into 100 by making a 2-stage configuration with ten series resistors, and it is possible to divide the voltage range between P1 and P2 into 64 by making a 3-stage configuration with four series resistors. As the number of resolution steps in the voltage range between P1 and P2 increases, the configuration example of FIG. 9 becomes more advantageous in the viewpoint of area than the configuration example of FIG. 4. In addition, for example, when it is necessary to further reduce the area, in place of the CMOS switch, a PMOS switch or an NMOS switch may be employed as the configuration of each switch SW. In this case, the gate bias is set so that the ON resistance becomes sufficiently small.

Next, in the same manner as in FIG. 4, the influence of the absolute value precision of the internal resistors RI will be examined. As an example, for example, the standard resistance value of the respective piezoresistors RP1 to RP4 is set to 5 kΩ, and the constant current source IS is set to 0.533 mA, and the external resistors RE are set to 75Ω, and the respective internal resistors RI11 to RI14 and RI21 to RI24 is set to 5 kΩ. In this case, the voltage between P1 and P2 becomes about 20 mV ((0.533 mA/2)×75Ω), and it is possible to adjust this section at a 1.25 mV step. Herein, it is assumed that the absolute value precision of the external resistors RE is ±1%, and the absolute value precision of the internal resistors RI is ±30%.

The equivalent circuit upon obtaining the combined resistance between P1 and P2 becomes a circuit in which the external resistor RE and the internal resistors RI11 to RI14 are connected in parallel between P1 and P2, and further, one internal resistor of RI11 to RI14 and the internal resistors RI21 to RI24 are connected in parallel. In this equivalent circuit, because the unevenness of the absolute value precision of the portion of RI21 to RI24 has a sufficiently smaller influence on the combined resistance between P1 and P2 than the unevenness of the absolute value precision of the portion of RI11 to RI14, therefore herein, it is assumed that there is no unevenness of the absolute value precision of the portion of RI21 to RI24. In this case, with regard to the parallel connection portion of one of RI11 to RI14 and RI21 to RI24, the standard combined resistance value thereof becomes 19 kΩ when RI11 to RI14 are set to 5 kΩ respectively and RI21 to RI24 are set to 5 kΩ respectively.

Therefore, the combined resistance value at the standard time between P1 and P2 becomes a parallel resistance of 75Ω and 19 kΩ, and it is 74.705Ω. In addition, the combined resistance value at maximum becomes a parallel resistance of (75×1.01Ω) and (19 k×1.3Ω), and it is 75.518Ω. On the other hand, the combined resistance value at minimum becomes the parallel resistance of (75×0.99Ω) and (19 k×0.7Ω), and becomes 73.838Ω. Therefore, on the basis of the combined resistance value at the standard time, it is +1.09% at maximum, and −1.16% at minimum, and the influence of the absolute value precision of the internal resistors RI is only around 0.09 to 0.16%. However, in comparison with the case of the configuration example of FIG. 4 mentioned above (0.02 to 0.04%), the influence becomes larger. Therefore, from the viewpoint of the precision, the configuration example of FIG. 4 is more preferable.

Fourth Embodiment

Figure 10:
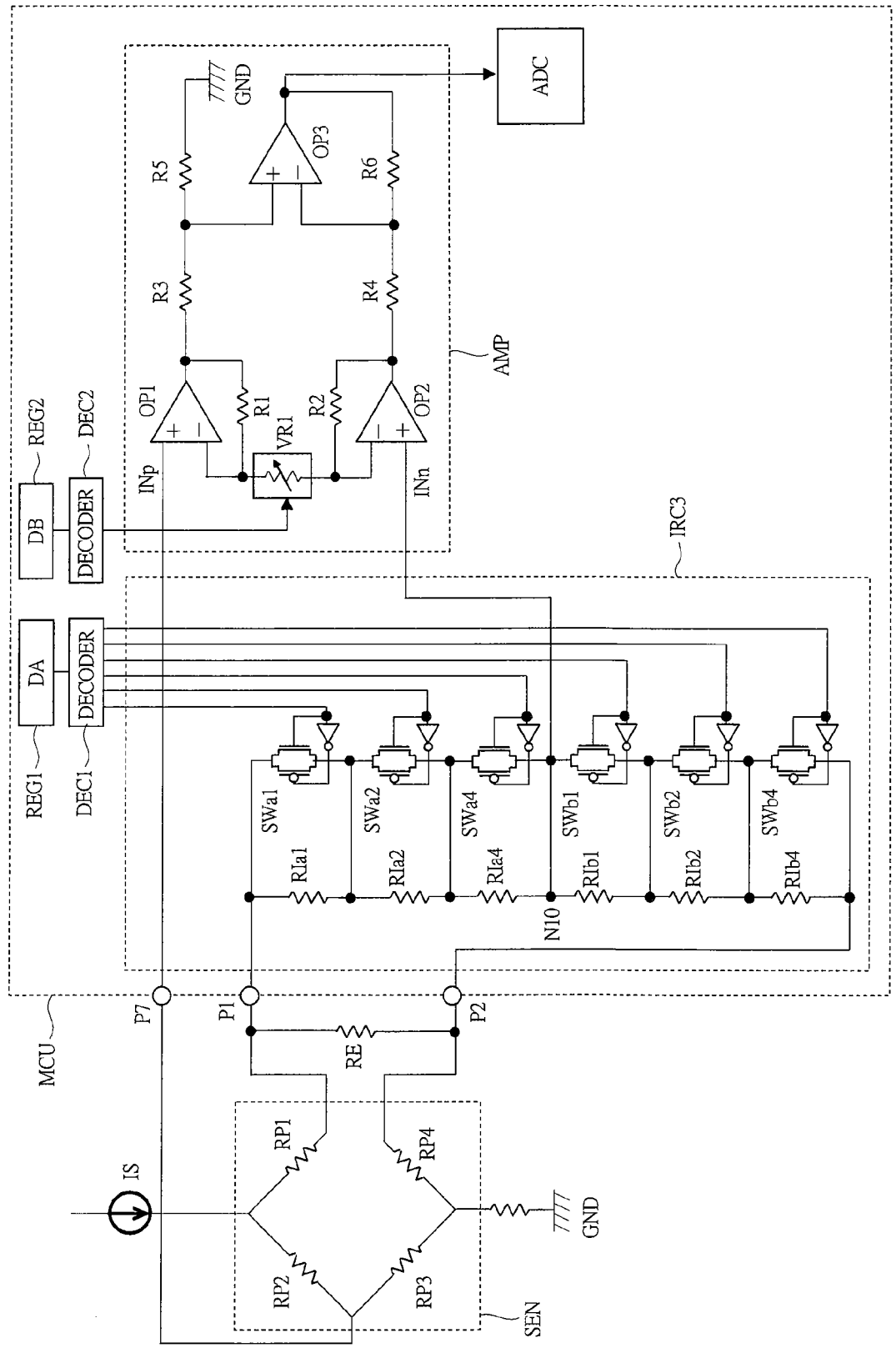
FIG. 10 is a circuit diagram showing a detailed configuration example of the circumference of the internal resistor circuit of FIG. 1 in a semiconductor pressure sensor device according to a fourth embodiment of the present invention.

In a fourth embodiment, a modified example of the internal resistor circuit IRC1 of FIG. 4 mentioned in the first embodiment will be described. FIG. 10 is a circuit diagram showing a detailed configuration example of the circumference of the internal resistor circuit IRC of FIG. 1, in a semiconductor pressure sensor device according to the fourth embodiment of the present invention. The internal resistor circuit IRC3 shown in FIG. 10 includes, for example, six internal resistors RIa1, RIa2, RIa4, RIb1, RIb2, RIb4, and six switches (CMOS switches) SWa1, SWa2, SWa4, SWb1, SWb2, SWb4.

The internal resistors RIa1, RIa2, RIa4 are connected in series between the external input terminal P1 and the node N10, and the internal resistors RIb1, RIb2, and RIb4 are connected in series between the node N10 and the external input terminal P2. The switch SWa1 is connected to RIa1 in parallel, and in the same manner, the switches SWa2, SWa4, SWb1, SWb2, and SWb4 are connected to RIa2, RIa4, RIb1, RIb2, and RIb4 in parallel. The ON/OFF of these switches SW is controlled by the set value DA stored in the register REG1. The node N10 becomes the output node of the internal resistor circuit IRC3, and becomes the node of the signal INn.

In addition, the amplification circuit AMP in FIG. 10 has the same circuit configuration as that in FIG. 4, and amplifies the potential difference between the signal INn and the signal INp inputted through the external input terminal P7, and outputs the result to the analog-digital conversion unit ADC. The amplification rate of this amplification circuit AMP can be set by the set value DB stored in the register REG2, as described in FIG. 4.

In such a configuration, the resistance value of the respective internal resistors RI are set as, for example, RIa1=RIb1, RIa2=RIb2, RIa4=RIb4, and RIa2 (RIb2) is set to have double the resistance value of RIa1 (RIb1), and RIa4 (RIb4) is set to have four times the resistance value of RIa1 (RIb1). When RIa1 is 10 kΩ, it becomes that RIa2=20 kΩ, and RIa4=40 kΩ. Then, by controlling the ON/OFF combination of SWa1, SWa2, and SWa4, the resistance value between P1 and the node N10 can be set in eight ways such as 0 time, 1 time, 2 times, ... , 7 times of the resistance value of RIa1. For example, it can be set to 0 time by (SWa1, SWa2, SWa4)=(ON, ON, ON), it can be set to 1 time by (OFF, ON, ON), and it can be set to 3 times by (OFF, OFF, ON).

In the same manner, by controlling the ON/OFF combination of SWb1, SWb2, and SWb4, the resistance value between the node N10 and P2, eight ways of setting are possible. Therefore, the resistance division ratio of the external resistor RE can be set in 64 ways (8 ways×8 ways) equivalently. In other words, 64 ways of different voltage signals can be extracted from the voltage range between P1 and P2, respectively. But in practice, in the 64 ways, there are duplicated cases where the resistance division ratio becomes 1:1, and accordingly, the number of the selections becomes around the half thereof substantially.

By use of such a configuration as shown in FIG. 10, in addition to the various effects mentioned in FIG. 4, the offset adjustment of a high resolution in a small area becomes feasible. In other words, in order to obtain selections, for example, around 32 ways by use of the configuration example of FIG. 4, 32 internal resistors RI and 33 switches SW are necessary. But, in the configuration example of FIG. 10, six internal resistors RI and six switches SW are sufficient. But, in the configuration example of FIG. 10, because the voltage width of each step does not become constant, from the viewpoint of easiness of the offset adjustment, the configuration examples in FIGS. 4 and 9 are more preferable.

Note that, herein, six internal resistors and switches are arranged; but of course, larger number of internal resistors and switches may be arranged. For example, when eight internal resistors are arranged, four internal resistors RIa1, RIa2 (2 times), RIa4 (4 times), and RIa8 (8 times) are arranged between P1 and N10, and four internal resistors are arranged between N10 and P2 in the same manner. In other words, internal resistor to become the standard (herein, RIa1), resistors whose resistance value becomes $2^N$ times are arranged sequentially. In addition, here, resistors are arranged so that RIa1=RIb1, RIa2=RIb2, and RIa4=RIb4, but, they may be arranged so that RIa1≠RIb1, RIa2≠RIb2, and RIa4≠RIb4. Then, although the offset adjustment method becomes more complicated, it is possible to further increase the number of selections.

Fifth Embodiment

Figure 11:
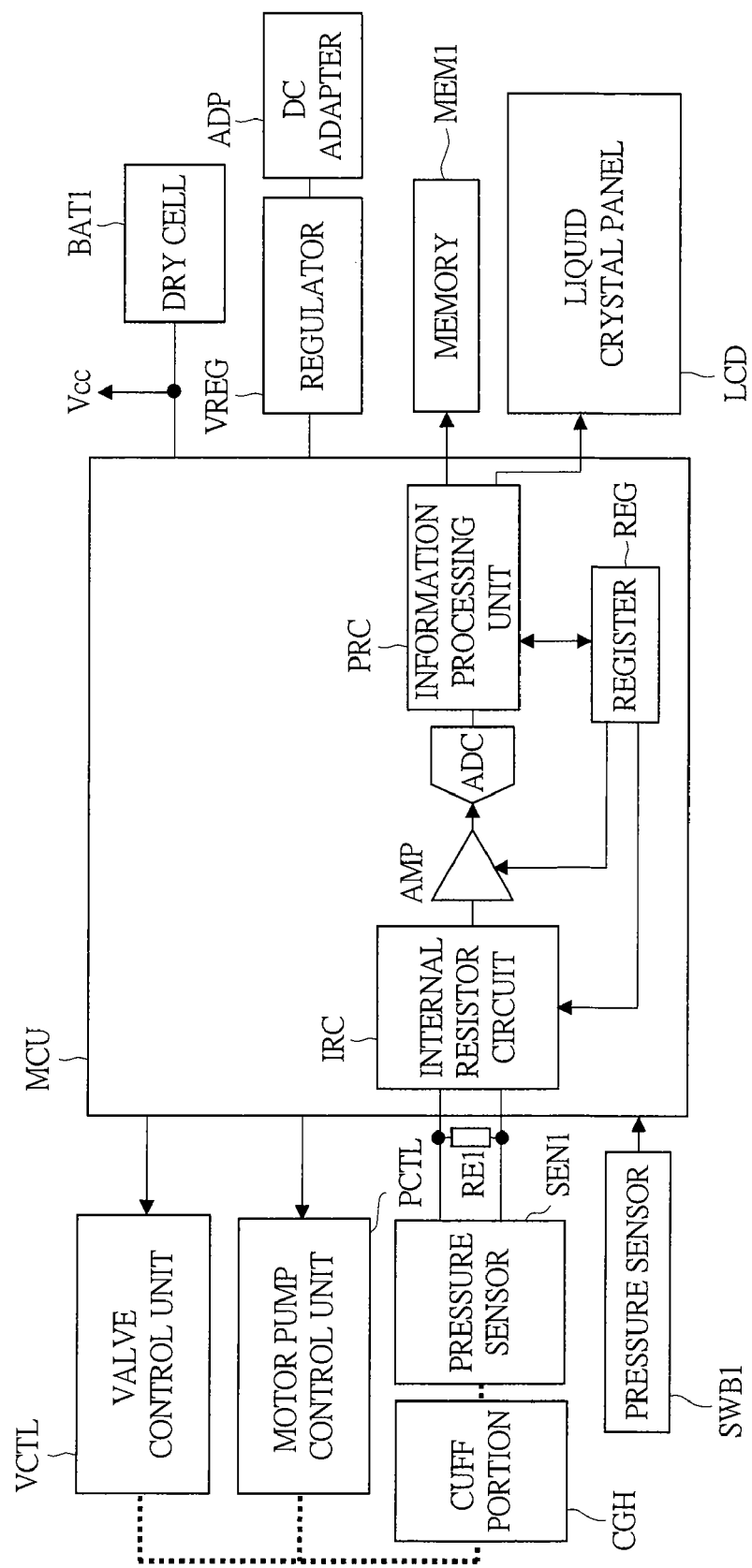
FIG. 11 is a block diagram showing a schematic configuration example where the semiconductor pressure sensor device according to a fifth embodiment of the present invention is applied to an electronic manometer.
Figure 12:
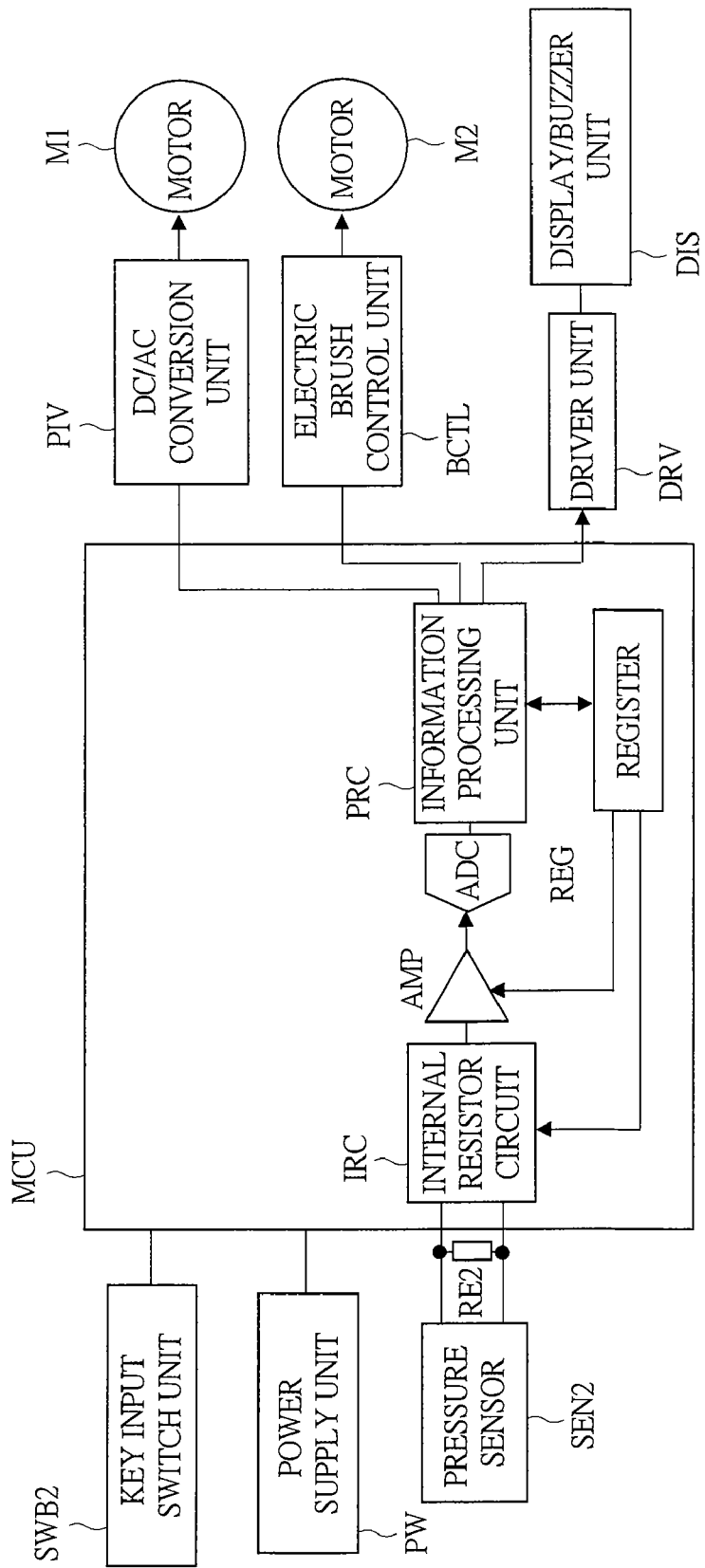
FIG. 12 is block diagram showing a schematic configuration example where the semiconductor pressure sensor device according to the fifth embodiment of the present invention is applied to a vacuum cleaner.
Figure 13:
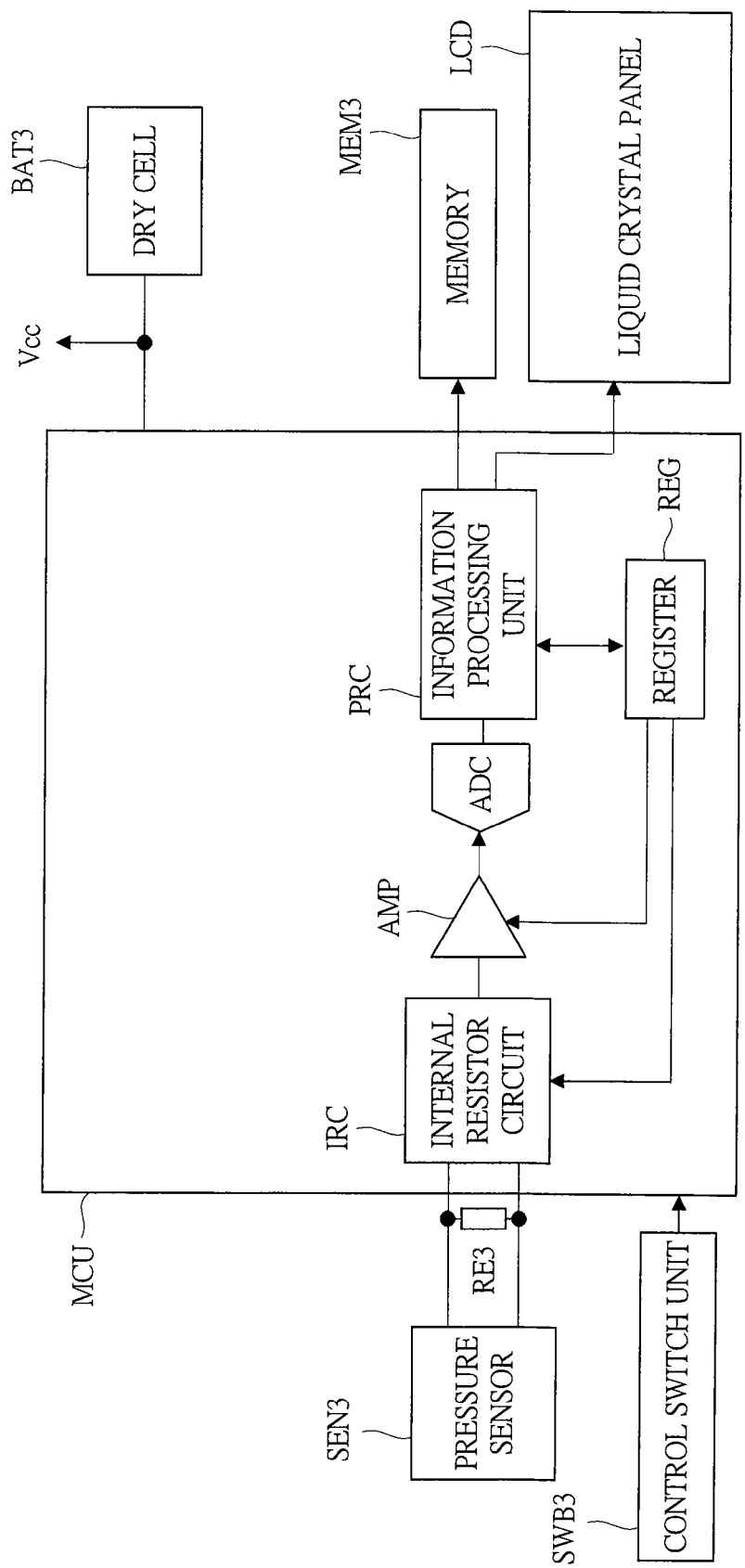
FIG. 13 is block diagram showing a schematic configuration example where the semiconductor pressure sensor device according to the fifth embodiment of the present invention is applied to a barometer.

In a fifth embodiment, representative application examples of the semiconductor pressure sensor devices described in the foregoing will be described. FIG. 11 is a block diagram showing an outline configuration example where the semiconductor pressure sensor device according to the fifth embodiment of the present invention is applied to an electronic manometer. FIG. 12 is a block diagram showing an outline configuration example where the semiconductor pressure sensor device according to the fifth embodiment of the present invention is applied to a vacuum cleaner. FIG. 13 is a block diagram showing an outline configuration example where the semiconductor pressure sensor device according to the fifth embodiment of the present invention is applied to a barometer.

The electronic manometer shown in FIG. 11 includes various parts in addition to the pressure sensor SEN1, the processor MCU, and the external resistor RE1 as mentioned in the first to fourth embodiments. For example, a cuff portion CGH is a widely known part that is wound around the arm and used, and the pressure from this cuff portion CGH is impressed to the pressure sensor SEN1. A valve control unit VCTL and a motor pump control unit PCTL are controlled by the processor MCU to adjust the air pressure to be impressed to this cuff portion CGH when a blood pressure measurement is carried out. A control switch unit SWB1 corresponds to various operating switches to become a user interface such as, for example, a power button or a reset button and the like, and the processor MCU receives information from these and performs specified operations.

A dry cell battery BAT1, a DC adapter ADP and a regulator VREG supply electricity to the processor MCU and the like. The memory MEM1 is, for example, a nonvolatile memory, and records the blood pressure value measured by the pressure sensor SEN1. A liquid crystal panel LCD is controlled by the processor MCU, and displays measured blood pressure values and the like. In addition, the information processing unit PRC in the processor MCU corresponds to the CPU and the RAM and the like in FIG. 1.

A vacuum cleaner shown in FIG. 12 includes various parts in addition to the pressure sensor SEN2, the processor MCU, and the external resistor RE2 as described in the first to fourth embodiments. For example, a key input switch portion SWB2 corresponds to various operating switches to become a user interface such as, for example, a power button or a suction power adjustment switch and the like, and the processor MCU receives information from these and performs specified operations. A power supply unit PW supplies electricity to the processor MCU and the like.

The pressure sensor SEN2 is arranged at, for example, a dust suction port, and is used for error detection such as dust jamming or the control of the suction power. The DC/AC conversion unit (inverter) PIV controls the rotation of a motor M1 on the basis of the control by the processor MCU. The motor M1 generates a suction power corresponding to the rotation. An electric brush control unit BCTL controls the rotation of a motor M2 on the basis of the control by the processor MCU. The motor M2 is arranged at the nozzle unit of the vacuum cleaner and rotates a brush arranged in the nozzle unit. A driver unit DRV drives a display/buzzer unit DIS to notify, for example, dust jamming and the like on the basis of the control by the processor MCU.

The barometer shown in FIG. 13 includes various parts in addition to the pressure sensor SEN3, the processor MCU, and the external resistor RE3 as mentioned in the first to fourth embodiments. The control switch unit SWB3 has various operation switches to become a user interface, and the processor MCU receives information from these and performs a specified operation. A dry cell BAT3 supplies electricity to the processor MCU and the like. The memory MEM3 is, for example, a nonvolatile memory, and records the atmospheric pressure measured by the pressure sensor SEN3. A liquid crystal panel LCD is controlled by the processor MCU, and performs display of measured atmospheric pressure and the like.

The semiconductor pressure sensor device according to the present embodiment can be applied to various uses as exemplified above. When uses are different, some specifications such as each bridge resistance of the pressure sensors SEN1 to SEN3 are slightly different, and there may be cases where the adjustment range of the offset voltage is different, but this can be adjusted by the external resistors RE1 to RE3, and the processor MCU itself may be used in common. Therefore, low costs can be realized in particular at the viewpoint from the side to provide the processor MCU.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in FIGS. 4, 9, and 10, while concrete configuration examples of the internal resistor circuit IRC are shown, of course, the present invention is not limited to these. In other words, for example, the circuit may be one in which a plurality of resistors whose combined resistance values are in the order larger by one digit or above (preferably two digits or above) than the order of the resistance value of RE are connected to both ends of the external resistor RE, and an optional voltage value can be selected by use of the connected plurality of resistors from the range of the voltages between both ends mainly determined by this RE.

The semiconductor pressure sensor device according to one embodiment of the present invention is particularly a useful technology when applied to those products requiring a highly precise pressure measurement, for example, represented by an electronic manometer, and not limited to this, the semiconductor pressure sensor may be widely applied to various pressure sensor systems in general.

What is claimed is:

1. A semiconductor pressure sensor device comprising:
   a first pressure detection resistor connected between a first node and a second node;
   a second pressure detection resistor connected between the second node and a third node;
   a third pressure detection resistor connected between the third node and a fourth node;
   a fourth pressure detection resistor connected between the fourth node and a fifth node;
   an offset adjustment resistor connected between the first node and the fifth node; and
   an internal resistor circuit provided between the first node and the fifth node, and including a plurality of switches and a plurality of internal resistors whose combined resistance value has a sufficiently larger order than a value of the offset adjustment resistor, wherein
   the internal resistor circuit is formed on a semiconductor chip, and a selection signal is inputted to the plurality of switches, so that the internal resistor transmits a voltage selected in response to the selection signal from the range of a voltage of the first node and that of the fifth node to an output node.

2. The semiconductor pressure sensor device according to claim 1, wherein
   the offset adjustment resistor is arranged in the outside of the semiconductor chip.

3. The semiconductor pressure sensor device according to claim 1, wherein
   the plurality of internal resistors included in the internal resistor circuit are formed of polysilicon.

4. The semiconductor pressure sensor device according to claim 1, wherein
   the internal resistor circuit includes:
   a plurality of first internal resistors that are connected in series between the first node and the fifth node, and whose resistance values are made almost same; and
   a plurality of first switches that transmit the voltages of the respective connection nodes among the plurality of first internal resistors to the output node in response to the selection signal.

5. The semiconductor pressure sensor device according to claim 1, wherein
   the internal resistor circuit includes:
   a plurality of second internal resistors that are connected in series between the first node and the fifth node, and whose resistance values are made same;
   a plurality of second switches that select any one of the plurality of second internal resistors in response to the selection signal, and transmit a voltage of one end of the selected second internal resistor to a sixth node, and a voltage at the other end to a seventh node;

a plurality of third internal resistors that are connected in series between the sixth node and the seventh node, and whose resistance values are made almost same; and a plurality of third switches that transmit the voltages of the respective connection nodes among the plurality of third internal resistors to the output node in response to the selection signal.

6. The semiconductor pressure sensor device according to claim 1, wherein the internal resistor circuit includes:

a plurality of fourth internal resistors that are connected in series between the first node and the output node, and whose resistance values are made almost same;

a plurality of fourth switches that are arranged in response to the plurality of fourth internal resistors, and select one or more of the plurality of fourth internal resistors in response to the selection signal, and shortcircuit two ends of the selected fourth internal resistor, a plurality of fifth internal resistors that are connected in series between the output node and the fifth node, and whose resistance values are made almost same; and a plurality of fifth switches that are arranged in response to the plurality of fifth internal resistors, and select one or more of the plurality of fifth internal resistors in response to the selection signal, and shortcircuit two ends of the selected fifth internal resistor.

7. A semiconductor pressure sensor device comprising:

a first pressure detection resistor connected between a first node and a second node;

a second pressure detection resistor connected between the second node and a third node;

a third pressure detection resistor connected between the third node and a fourth node;

a fourth pressure detection resistor connected between the fourth node and a fifth node;

an offset adjustment resistor connected between the first node and the fifth node; and an information processing device including an internal resistor circuit, an amplification circuit, an analog-digital conversion circuit, and a processor, and formed on a semiconductor chip, wherein the internal resistor circuit includes:

a plurality of internal resistors that are arranged between the first node and the fifth node, and whose combined resistance value has a sufficiently larger order than the offset adjustment resistor, and that divides the voltage between the first node and the fifth node; and a plurality of switches that transmit the voltage to give a partial pressure ratio corresponding to a switch selection signal, by use of the plurality of internal resistors, and wherein the amplification circuit amplifies a voltage difference between the third node and the sixth node, the analog-digital conversion circuit converts an analog voltage amplified by the amplification circuit into a digital signal, and the processor computes a pressure value from the digital signal.

8. The semiconductor pressure sensor device according to claim 7, wherein the offset adjustment resistor is arranged in the outside of the semiconductor chip.

9. The semiconductor pressure sensor device according to claim 7, wherein the plurality of internal resistors included in the internal resistor circuit are formed of polysilicon.

10. The semiconductor pressure sensor device according to claim 7, wherein an offset adjustment program is packaged in the information processing device, the processor, when the offset adjustment program is run, performs a first processing to set a value of the switch selection signal, a second processing to read the digital signal of the analog-digital conversion circuit, and a third processing to determine the digital signal read in the second process and search for the value of the switch selection signal at which the analog voltage corresponding to the digital signal becomes smaller than a predetermined value.

* * * * *